(12) United States Patent
Kahtava et al.

(10) Patent No.: US 10,595,246 B2
(45) Date of Patent: Mar. 17, 2020

(54) WIRELESS TELECOMMUNICATIONS SYSTEM

(71) Applicant: SONY CORPORATION, Tokyo (JP)

(72) Inventors: Jussi Tapani Kahtava, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 37 days.

(21) Appl. No.: 15/750,966

(22) PCT Filed: Aug. 30, 2016

(86) PCT No.: PCT/EP2016/070384
§ 371 (c)(1),
(2) Date: Feb. 7, 2018

(87) PCT Pub. No.: WO2017/037047
PCT Pub. Date: Mar. 9, 2017

(65) Prior Publication Data
US 2018/0234898 A1    Aug. 16, 2018

(30) Foreign Application Priority Data

Sep. 4, 2015  (EP) .................................... 15183896

(51) Int. Cl.
*H04W 36/06*       (2009.01)
*H04W 4/021*       (2018.01)
(Continued)

(52) U.S. Cl.
CPC .......... *H04W 36/06* (2013.01); *H04W 4/021* (2013.01); *H04W 4/025* (2013.01); *H04W 4/40* (2018.02);
(Continued)

(58) Field of Classification Search
None
See application file for complete search history.

(56) References Cited

U.S. PATENT DOCUMENTS

2003/0054829 A1* 3/2003 Moisio .................. H04W 72/10
455/452.1
2008/0151843 A1* 6/2008 Valmikam ............ H04W 64/003
370/338
(Continued)

FOREIGN PATENT DOCUMENTS

EP    2 876 954 A1    5/2015
WO    WO2014169695    * 10/2014 ............ H04W 48/16

OTHER PUBLICATIONS

International Search Report dated Nov. 18, 2016, in PCT/EP2016/070384 filed Aug. 30, 2016.
(Continued)

*Primary Examiner* — Kathy W Wang-Hurst
*Assistant Examiner* — Frank E Donado
(74) *Attorney, Agent, or Firm* — XSENSUS LLP

(57) ABSTRACT

A first terminal device, for use in a wireless telecommunications system, including: a receiver; a transmitter; a storage medium operable to store mapping information identifying sets of predetermined radio resources and a predetermined geographical region associated with each respective set of predetermined radio resources; and a controller operable to: receive a geographical location, the geographical location of the terminal device being determined by a location unit; determine the predetermined geographical region of the received mapping information within which the determined geographical location is located; determine the set of predetermined radio resources associated with the determined geographical region using the received mapping information; control the receiver to receive signals from a second terminal device using the determined set of predetermined
(Continued)

radio resources; and control the transmitter to transmit signals to the second terminal device using the determined set of predetermined radio resources.

19 Claims, 7 Drawing Sheets

(51) Int. Cl.
*H04W 4/44* (2018.01)
*H04W 72/04* (2009.01)
*H04W 4/40* (2018.01)
*H04W 4/02* (2018.01)
*H04W 36/32* (2009.01)
*H04W 76/14* (2018.01)
*H04W 84/04* (2009.01)
*H04W 92/18* (2009.01)

(52) U.S. Cl.
CPC ............ *H04W 4/44* (2018.02); *H04W 36/32* (2013.01); *H04W 72/042* (2013.01); *H04W 72/048* (2013.01); *H04W 76/14* (2018.02); *H04W 84/042* (2013.01); *H04W 92/18* (2013.01)

(56) References Cited

U.S. PATENT DOCUMENTS

| | | | |
|---|---|---|---|
| 2012/0134336 A1 | 5/2012 | Nakaya et al. | |
| 2012/0178468 A1* | 7/2012 | Jeong | H01Q 23/00 455/452.1 |
| 2013/0157676 A1* | 6/2013 | Baek | H04W 72/0486 455/452.1 |
| 2014/0062773 A1* | 3/2014 | MacGougan | G01S 19/05 342/357.28 |
| 2014/0094180 A1* | 4/2014 | Zhou | H04W 40/30 455/445 |
| 2014/0162668 A1 | 6/2014 | Na et al. | |
| 2014/0273862 A1* | 9/2014 | Maaref | H04J 11/0026 455/63.1 |
| 2015/0094057 A1* | 4/2015 | Lu | H04W 8/005 455/434 |
| 2015/0173115 A1* | 6/2015 | Van Phan | H04W 4/021 455/404.2 |
| 2016/0057604 A1* | 2/2016 | Luo | H04W 8/005 370/330 |
| 2016/0073298 A1* | 3/2016 | Brahmi | H04W 36/0072 455/436 |
| 2016/0183121 A1* | 6/2016 | Kazmi | H04W 28/18 370/230 |
| 2016/0345307 A1* | 11/2016 | Huang | H04W 52/0216 |
| 2017/0064605 A1* | 3/2017 | Wang | H04W 76/18 |

OTHER PUBLICATIONS

Holma, Harri et al., "LTE for UMTS: OFDMA and SC-FDMA Based Radio Access", Wiley, (2009), ISBN 978-0-470-99401-6, 4 pages.

Chae, Hyang Sin et al., "Radio Resource Allocation Scheme for Device-to-Device Communication in Cellular Networks Using Fractional Frequency Reuse", 2011 17th Asia-Pacific Conference on Communication (APCC), (2011), pp. 58-62.

* cited by examiner

WIRELESS TELECOMMUNICATIONS SYSTEM

CROSS-REFERENCE TO RELATED APPLICATIONS

The present application is based on PCT filing PCT/EP2016/070384 filed Aug. 30, 2016 and claims priority to European Patent Application 15 183 896.8, filed in the European Patent Office on Sep. 4, 2015, the entire contents of each of which being incorporated herein by reference.

BACKGROUND

Field of the Disclosure

The present disclosure relates to a wireless telecommunications system.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

The automotive industry has been working for several years on solutions to enable communication with and between vehicles so as to help improve traffic flow and safety. These techniques range from automatic tolling technologies to collision prevention mechanisms, and are generally known as Intelligent Transport Systems (ITS). Currently, the main radio technology that is being considered in standards projects is a WLAN derivative 802.11p, which would be used for broadcasting ITS information to vehicles. This constitutes a so-called Dedicated Short Range Communication (DSRC) system that is deployed at 5.9 GHz ITS band in Europe (there may be different ITS bands in use in other regions, e.g. 700 MHz in Japan).

The effective range of DSRC systems is a few hundred meters and the services are broadcast oriented (emergency vehicle notices, for example). It is considered that mobile telecommunications networks, such as Long Term Evolution (LTE) on International Mobile Telecommunications (IMT) bands, could fulfil at least some of the ITS needs, and also provide wider and cheaper coverage. In particular, where the existing cellular network already covers roadways the capital expenditure costs may be a fraction of what is needed for setting up a new DSRC-based ITS network.

LTE is understood to play an increasingly important role in the connected vehicle ecosystem. LTE based solutions may in particular bring improvements in spectral efficiency, effective communications range, throughput, error resiliency and Quality of Service. It is noted that LTE networks are finding new areas of deployment with each new 3GPP Release. Release 12 introduced Public Safety aspects on device-to-device (D2D) communications, and Release 13 continues to develop the D2D concepts further. In Release 14 stage 3GPP starts to discuss vehicular communications, effectively considering whether and how LTE networks could support Intelligent Transport Systems (ITS).

Connected vehicle systems are called V2X, which consists of V2V (vehicle-to-vehicle), V2P (vehicle-to-pedestrian) and V2I (vehicle-to-infrastructure). Infrastructure in this case may be the roadside ITS related infrastructure or backbone systems in Internet or mobile networks. Some examples or services in connected car environment are Cooperative Awareness Message (CAM) and Decentralised Environmental Notification (DEN). These constitute applications such as allowing emergency vehicles to broadcast their presence and allowing roadside infrastructure to broadcast speed limit information to vehicles. It is envisaged that LTE will work with 802.11p in order to provide such services, and that both radio technologies will likely find applications in the connected vehicle ecosystem.

It has been proposed that V2X communications may be implemented using dedicated Road Side Units (RSUs) which communicate with vehicles and which assign radio resources for use by the vehicles in V2X communications. In particular, such RSUs may allocate D2D radio resources for use in V2X communications. However, it is unlikely that all the roadways in a country would have RSUs installed, particularly in more rural areas. However, for fully functioning V2X services to take place it is important that the V2X vehicles can always communicate with other V2X enabled vehicles in proximity, even in the absence of RSUs. The present disclosure aims to alleviate this problem.

SUMMARY

In a first aspect, the present technique provides a first terminal device for use in a wireless telecommunications system, the first terminal device comprising: a receiver; a transmitter; a storage medium operable to store mapping information, the mapping information identifying sets of predetermined radio resources and a predetermined geographical region associated with each respective set of predetermined radio resources; and a controller operable to: receive a geographical location of the terminal device, the geographical location of the terminal device being determined by a location unit; determine the predetermined geographical region of the received mapping information within which the determined geographical location is located; determine the set of predetermined radio resources associated with the determined geographical region using the received mapping information; control the receiver to receive signals from a second terminal device using the determined set of predetermined radio resources; and control the transmitter to transmit signals to the second terminal device using the determined set of predetermined radio resources.

In an embodiment, the receiver is operable to receive the mapping information from a base station and the controller is operable to store the received mapping information in the storage medium.

In an embodiment, the first terminal device comprises the location unit.

In an embodiment, the controller is operable to: determine, based on the geographical location of the first terminal device determined by the location unit, when the location of the first terminal device changes from being within a first predetermined geographical region of the mapping information to being within a second predetermined geographical region of the mapping information; determine the set of predetermined radio resources associated with the second predetermined geographical region using the mapping information; control the receiver to switch from receiving signals from a second terminal device using the set of predetermined radio resources associated with the first predetermined geographical region to receiving signals from the second terminal device using the set of predetermined radio resources associated with the second predetermined geographical region; and control the transmitter to switch from transmitting signals to the second terminal device using the set of predetermined radio resources associated with the first predetermined geographical region to transmitting signals to the second terminal device using the set of predetermined radio resources associated with the second predetermined geographical region.

In an embodiment, there is a region of spatial overlap between the first predetermined geographical region and the second predetermined geographical region, and the controller is operable to: determine, based on the geographical location of the first terminal device determined by the location unit, when the first terminal device is located in the region of spatial overlap; control the receiver to begin receiving signals from a second terminal device using the set of predetermined radio resources associated with the second predetermined geographical region in addition to receiving signals from the second terminal device using the set of predetermined radio resources associated with the first predetermined geographical region; and control the transmitter to begin transmitting signals to the second terminal device using the set of predetermined radio resources associated with the second predetermined geographical region in addition to transmitting signals to the second terminal device using the set of predetermined radio resources associated with the first predetermined geographical region.

In an embodiment, the controller is operable to: control the receiver to continue to receive signals from a second terminal device using the set of predetermined radio resources associated with the first predetermined geographical region until the reception of the signals has been completed; and control the transmitter to continue to transmit signals to the second terminal device using the set of predetermined radio resources associated with the first predetermined geographical region until the transmission of the signals has been completed.

In an embodiment, the controller is operable to: control the receiver to continue to receive signals from a second terminal device using the set of predetermined radio resources associated with the first predetermined geographical region until a predetermined time period has elapsed; and control the transmitter to continue to transmit signals to the second terminal device using the set of predetermined radio resources associated with the first predetermined geographical region until the predetermined time period has elapsed.

In an embodiment, when the controller determines that the location of the first terminal device has changed from being within the first predetermined geographical region to being within the second predetermined geographical region, the controller is operable to control the transmitter to transmit a message to a second terminal device located in the first predetermined geographical region instructing the second terminal device to switch from receiving signals from and transmitting signals to the first terminal device using the set of predetermined radio resources associated with the first geographical region to receiving signals from and transmitting signals to the first terminal device using the set of predetermined radio resources associated with the second geographical region.

In an embodiment, when the controller determines that the location of the first terminal device has changed from being within the first predetermined geographical region to being within the second predetermined geographical region, the controller is operable to control the transmitter to transmit a message to a second terminal device located in the second predetermined geographical region instructing the second terminal device to switch from receiving signals from and transmitting signals to the first terminal device using the set of predetermined radio resources associated with the first geographical region to receiving signals from and transmitting signals to the first terminal device using the set of predetermined radio resources associated with the second geographical region.

In an embodiment, the receiver is operable to receive a message from a second terminal device located in the second predetermined geographical region instructing the first terminal device to switch from receiving signals from and transmitting signals to the second terminal device using the set of predetermined radio resources associated with the first geographical region to receiving signals from and transmitting signals to the second terminal device using the set of predetermined radio resources associated with the second geographical region; and the controller is operable to, in response to the receiver receiving the message: control the receiver to switch from receiving signals from the second terminal device using the set of predetermined radio resources associated with the first predetermined geographical region to receiving signals from the second terminal device using the set of predetermined radio resources associated with the second predetermined geographical region; and control the transmitter to switch from transmitting signals to the second terminal device using the set of predetermined radio resources associated with the first predetermined geographical region to transmitting signals to the second terminal device using the set of predetermined radio resources associated with the second predetermined geographical region.

In an embodiment, the receiver is operable to receive the message when the first terminal device is located in the first predetermined geographical region.

In an embodiment, the receiver is operable to receive the message when the first terminal device is located in the second predetermined geographical region; and the controller is operable to delay controlling the receiver to switch from receiving signals from the second terminal device using the set of predetermined radio resources associated with the first predetermined geographical region to receiving signals from the second terminal device using the set of predetermined radio resources associated with the second predetermined geographical region and to delay controlling the transmitter to switch from transmitting signals to the second terminal device using the set of predetermined radio resources associated with the first predetermined geographical region to transmitting signals to the second terminal device using the set of predetermined radio resources associated with the second predetermined geographical region until the receiver has received the message.

In an embodiment, the sets of predetermined radio resources are for device-to-device (D2D) communication between the first terminal device and second terminal device.

In an embodiment, the set of predetermined radio resources is the same for a first predetermined geographical region of the received mapping information and a second predetermined geographical region of the received mapping information, the first and second predetermined geographical regions being separated by a distance such as to avoid radio interference between the first and second predetermined geographical regions.

In an embodiment, each predetermined geographical region identified in the mapping information comprises a portion of a road.

In an embodiment, the receiver is operable to receive the mapping information as information which is broadcast from the base station.

In an embodiment, the controller is operable to control the transmitter to transmit the mapping information to a second terminal device.

In a second aspect, the present technique provides a transport vehicle comprising a first terminal device according to the first aspect.

In a third aspect, the present technique provides a base station for use in a wireless telecommunications system, the base station comprising: a controller operable to allocate sets of predetermined radio resources to each of respective predetermined geographical regions; and a transmitter operable to transmit mapping information to each of a plurality of terminal devices, the mapping information identifying each set of predetermined radio resources and its associated predetermined geographical region, wherein each terminal device is operable to determine its geographical location, determine the predetermined geographical region of the received mapping information within which the determined geographical location is located, determine the set of predetermined radio resources associated with the determined geographical region using the mapping information, and perform communication with another one of the terminal devices located in the determined geographical region using the determined set of predetermined radio resources.

In an embodiment, the mapping information identifies sets of predetermined radio resources associated with respective predetermined geographical regions located within the cell of a neighbouring base station.

In an embodiment, the controller is operable to change the amount of predetermined radio resources allocated to one or more of the respective predetermined geographical regions in accordance with an expected demand for radio resources by terminal devices located in the one or more of the respective predetermined geographical regions; and the transmitter is operable to, in response to a change in the amount of predetermined radio resources allocated to the one or more respective predetermined geographical region, transmit updated mapping information to each of the plurality of terminal devices, the updated mapping information identifying each changed set of predetermined radio resources and its associated predetermined geographical region.

In an embodiment, the transmitter is operable to broadcast the mapping information to each of the plurality of terminal devices.

In a fourth aspect, the present technique provides a base station for use in a wireless telecommunications system, the base station comprising: a controller operable to select a set of predetermined radio resources for each of a plurality of predetermined geographical regions, each of the predetermined geographical regions being associated with at least one selectable set of predetermined radio resources to define mapping information, the mapping information being stored in each of a plurality of terminal devices; and a transmitter operable to transmit information indicating the selected sets of predetermined radio resources to each terminal device, wherein each terminal device is operable to determine its geographical location, determine the predetermined geographical region of the mapping information within which the determined geographical location is located, determine the selected set of predetermined radio resources associated with the determined geographical region using the mapping information and the information transmitted by the transmitter, and perform communication with another one of the terminal devices located in the determined geographical region using the determined set of predetermined radio resources.

In a fifth aspect, the present technique provides a wireless telecommunications system comprising a first terminal device according to the first aspect and a base station according to the third aspect.

In a sixth aspect, the present technique provides a wireless telecommunications system comprising a first terminal device according to the first aspect and a base station according to the fourth aspect.

In a seventh aspect, the present technique provides a method of operating a first terminal device for use in a wireless telecommunications system, the first terminal device comprising a receiver, a transmitter, and a storage medium operable to store mapping information, the mapping information identifying sets of predetermined radio resources and a predetermined geographical region associated with each respective set of predetermined radio resources, wherein the method comprises: controlling the receiver to receive a geographical location of the terminal device, the geographical location of the terminal device being determined by a location unit; determining the predetermined geographical region of the received mapping information within which the determined geographical location is located; determining the set of predetermined radio resources associated with the determined geographical region using the received mapping information; controlling the receiver to receive signals from a second terminal device using the determined set of predetermined radio resources; and controlling the transmitter to transmit signals to the second terminal device using the determined set of predetermined radio resources.

In an eighth aspect, the present technique provides a storage medium storing a computer program for controlling a computer to perform a method according to the seventh aspect.

In a ninth aspect, the present technique provides a method of operating a base station for use in a wireless telecommunications system, the base station comprising a transmitter, wherein the method comprises: allocating sets of predetermined radio resources to each of respective predetermined geographical regions; and controlling the transmitter e to transmit mapping information to each of a plurality of terminal devices, the mapping information identifying each set of predetermined radio resources and its associated predetermined geographical region, wherein each terminal device is operable to determine its geographical location, determine the predetermined geographical region of the received mapping information within which the determined geographical location is located, determine the set of predetermined radio resources associated with the determined geographical region using the mapping information, and perform communication with another one of the terminal devices located in the determined geographical region using the determined set of predetermined radio resources.

In a tenth aspect, the present technique provides a storage medium storing a computer program for controlling a computer to perform a method according to the ninth aspect.

In an eleventh aspect, the present technique provides a method of operating a base station for use in a wireless telecommunications system, the base station comprising a transmitter, wherein the method comprises: selecting a set of predetermined radio resources for each of a plurality of predetermined geographical regions, each of the predetermined geographical regions being associated with at least one selectable set of predetermined radio resources to define mapping information, the mapping information being stored in each of a plurality of terminal devices; and controlling the transmitter to transmit information indicating the selected sets of predetermined radio resources to each terminal device, wherein each terminal device is operable to determine its geographical location, determine the predetermined geographical region of the mapping information within which the determined geographical location is located, determine the selected set of predetermined radio resources associated with the determined geographical region using the mapping information and the information transmitted by the transmitter, and perform communication with another one of the terminal devices located in the determined geographical region using the determined set of predetermined radio resources.

In a twelfth aspect, the present technique provides a storage medium storing a computer program for controlling a computer to perform a method according to the eleventh aspect.

In a thirteenth aspect, the present technique provides a first terminal device for use in a wireless telecommunications system, the first terminal device comprising: receiver circuitry; transmitter circuitry; storage circuitry operable to store mapping information, the mapping information identifying sets of predetermined radio resources and a predetermined geographical region associated with each respective set of predetermined radio resources; and controller circuitry operable to: receive a geographical location of the terminal device, the geographical location of the terminal device being determined by location circuitry; determine the predetermined geographical region of the received mapping information within which the determined geographical location is located; determine the set of predetermined radio resources associated with the determined geographical region using the received mapping information; control the receiver circuitry to receive signals from a second terminal device using the determined set of predetermined radio resources; and control the transmitter circuitry to transmit signals to the second terminal device using the determined set of predetermined radio resources.

In a fourteenth aspect, the present technique provides a base station for use in a wireless telecommunications system, the base station comprising: controller circuitry operable to allocate sets of predetermined radio resources to each of respective predetermined geographical regions; and transmitter circuitry operable to transmit mapping information to each of a plurality of terminal devices, the mapping information identifying each set of predetermined radio resources and its associated predetermined geographical region, wherein each terminal device is operable to determine its geographical location, determine the predetermined geographical region of the received mapping information within which the determined geographical location is located, determine the set of predetermined radio resources associated with the determined geographical region using the mapping information, and perform communication with another one of the terminal devices located in the determined geographical region using the determined set of predetermined radio resources.

In a fifteenth aspect, the present technique provides a base station for use in a wireless telecommunications system, the base station comprising: controller circuitry operable to select a set of predetermined radio resources for each of a plurality of predetermined geographical regions, each of the predetermined geographical regions being associated with at least one selectable set of predetermined radio resources to define mapping information, the mapping information being stored in each of a plurality of terminal devices; and transmitter circuitry operable to transmit information indicating the selected sets of predetermined radio resources to each terminal device, wherein each terminal device is operable to determine its geographical location, determine the predetermined geographical region of the mapping information within which the determined geographical location is located, determine the selected set of predetermined radio resources associated with the determined geographical region using the mapping information and the information transmitted by the transmitter, and perform communication with another one of the terminal devices located in the determined geographical region using the determined set of predetermined radio resources.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
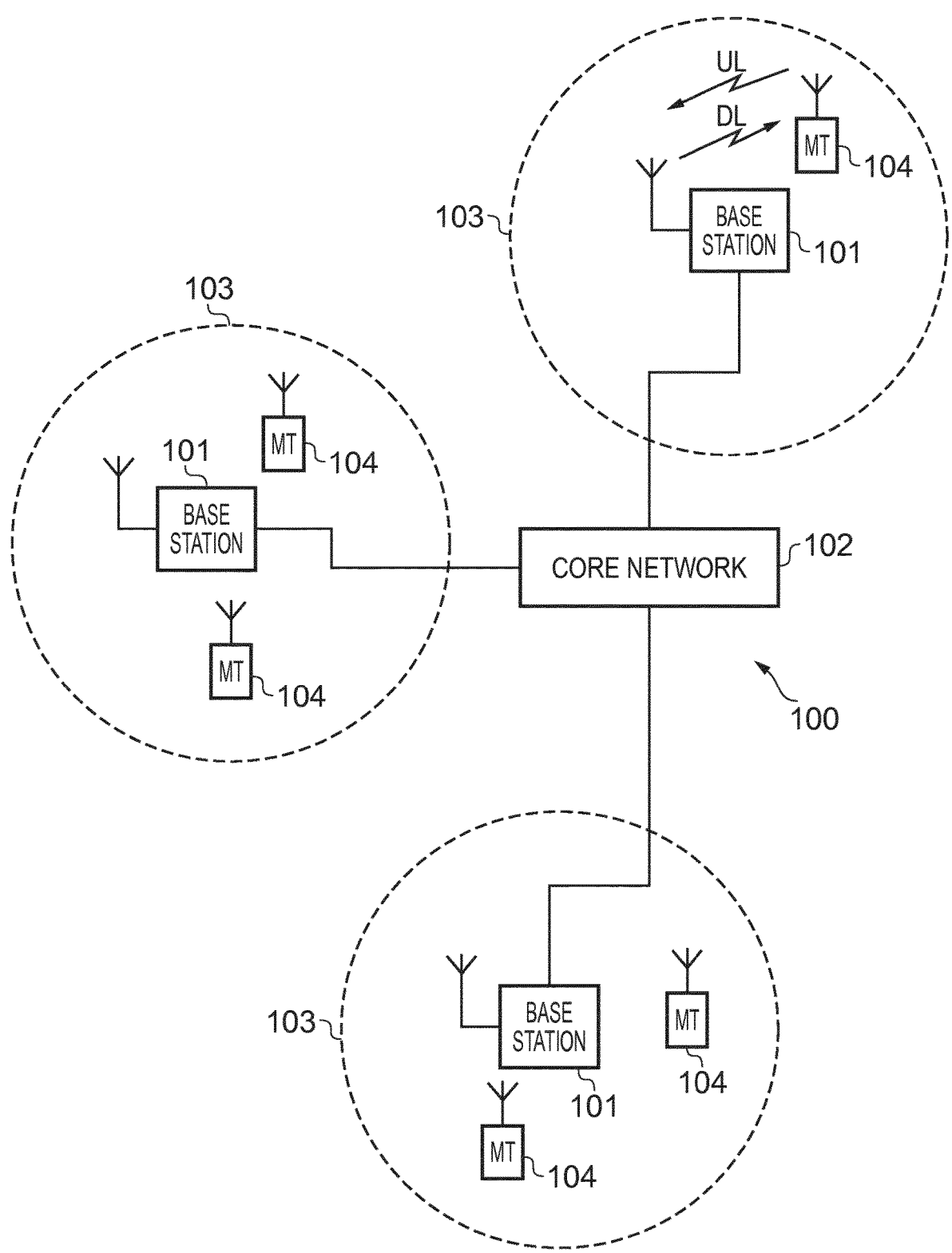
FIG. 1 schematically illustrates some basic functionality of a conventional mobile telecommunications network.

Referring now to the drawings, wherein like reference numerals designate identical or corresponding parts throughout the several views.

FIG. 1 provides a schematic diagram illustrating some basic functionality of a conventional mobile telecommunications network, using for example a 3GPP defined UMTS and/or Long Term Evolution (LTE) architecture. The mobile telecommunications network/system 100 of FIG. 1 operates in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licensed for use by the operator of the network 100. The core network 102 routes data to and from the terminal devices 104 via the respective base stations 101 and provides functions such as authentication, mobility management, charging and so on. Terminal devices may also be referred to as mobile stations, user equipment (UE), user terminal, mobile terminal, mobile device, terminal, mobile radio, and so forth. Base stations may also be referred to as transceiver stations/nodeBs/e-nodeBs/eNodeB, eNB, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 101 of FIG. 1 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 101 may be realized as any other types of base stations such as a NodeB and a base transceiver station (BTS). The base station 101 may include a main body (that is also referred to as a base station apparatus) configured to control radio communication, and one or more remote radio heads (RRH) disposed in a different place from the main body. In addition, various types of terminals, which will be described below, may each operate as the base station 101 by temporarily or semi-persistently executing a base station function.

Any of the terminal devices 104 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal device 104 may also be realized as a terminal (that is also referred to as a machine type communication (MTC) terminal) that performs machine-to-machine (M2M) communication. Furthermore, the terminal device 104 may be a radio communication module (such as an integrated circuit module including a single die) mounted on each of the terminals In the present disclosure, a base station providing a small cell is generally differentiated from a conventional base station mostly (and sometimes exclusively) in the range provided by the base station. Small cells include for example the cells also called femtocell, picocell or microcell. In other words, small cells can be considered as similar to macrocells in the channels and features provided to the terminals, but with the use of less power for base station transmissions, which results in a smaller range. A small can therefore be the cell or coverage provided by a small cell base station. In other examples, the term small cell can also refer to a component carrier when more than one component carriers are available.

Moreover, mobile networks can also include Relay Nodes (RN) which can further increase the complexity of the mobile system and of the reduction of interference in a small cell network. Relay technologies are known generally to provide an arrangement for receiving signals from a base station and for retransmitting the received signals to a UE in a mobile communications network, or to receive signals transmitted from a UE for re-transmission to a base station of a mobile communications network. The aim of such relay nodes is to try to extend a radio coverage area provided by a mobile communications network to reach communications devices which would otherwise be out of range of the mobile communications network or to improve the ratio of successful transmissions between a terminal and a base station.

A mobile network which includes a variety of base stations and/or relay nodes (e.g. macro-cell base stations, small cell base stations and/or relays) is sometimes referred to as a heterogeneous network.

Figure 2:
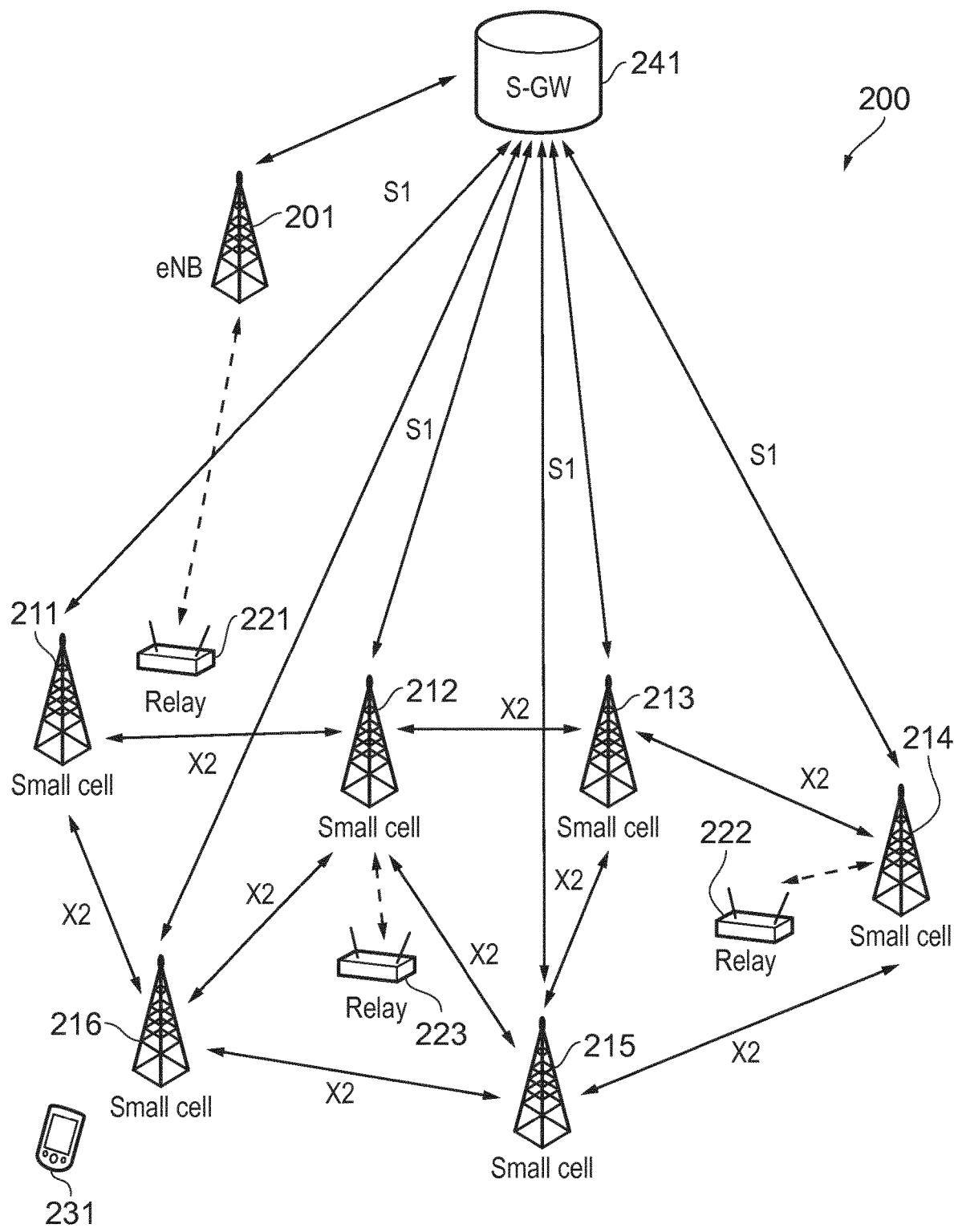
FIG. 2 schematically illustrates an example heterogeneous system for communicating with at least one terminal device.

FIG. 2 illustrates an example heterogeneous system 200 for communicating with at least a terminal 231. In this system 200, a base station 201 provides a macrocell and six base stations 211-216 provide small cell coverage, potentially overlapping with the coverage of the base station 201. Additionally, three RN 221-223 are provided and are operating with base stations 201, 214 and 212, respectively. A relay node can generally be defined as a wireless radio access point for relaying transmission and which thus does not implement all of the functionalities of a base station. It is in general not directly connected to the core network but uses wireless access (inband or outband) for backhaul link to connect with a base station. In other examples, the backhaul link may also be provided over a wired connection. This is in contrast to a small cell base station which, as mentioned above, can generally operate like a base station and is thus connected to the core network, as illustrated by the arrows between the small cell base stations 211-216 and the Serving Gateway "S-GW" in FIG. 2.

As previously mentioned, it is envisaged that V2X communications will make use of device-to-device (D2D) communication techniques. In current D2D resource allocation schemes in LTE Release 12, UEs request a D2D resource every time they have data to transmit. However, V2X communications will often relate to time critical, safety-related events (such as a vehicle suddenly braking), meaning that any delay associated with a vehicle UE (a vehicle UE being a UE comprised within a vehicle so as to allow the vehicle to undertake V2X communications) having to specifically request a D2D resource may not be acceptable. In order to overcome this problem, it has been proposed in the applicant's co-pending European patent applications EP 15174391.1 and EP 15174399.4 to use a semi-persistent resource allocation in which vehicle UEs are notified by RSUs of a priori reserved D2D allocations which they can access and use at a short notice without having to explicitly request such allocations. This is expected to work well for areas of road for which RSUs are installed. However, for roads for which RSUs are not installed (for example, rural roads), allocating D2D resources in this way becomes difficult. It is noted that any of the base station 201, base stations 211-216 and RNs (221-223) may be configured to act as an RSU.

Figure 3:
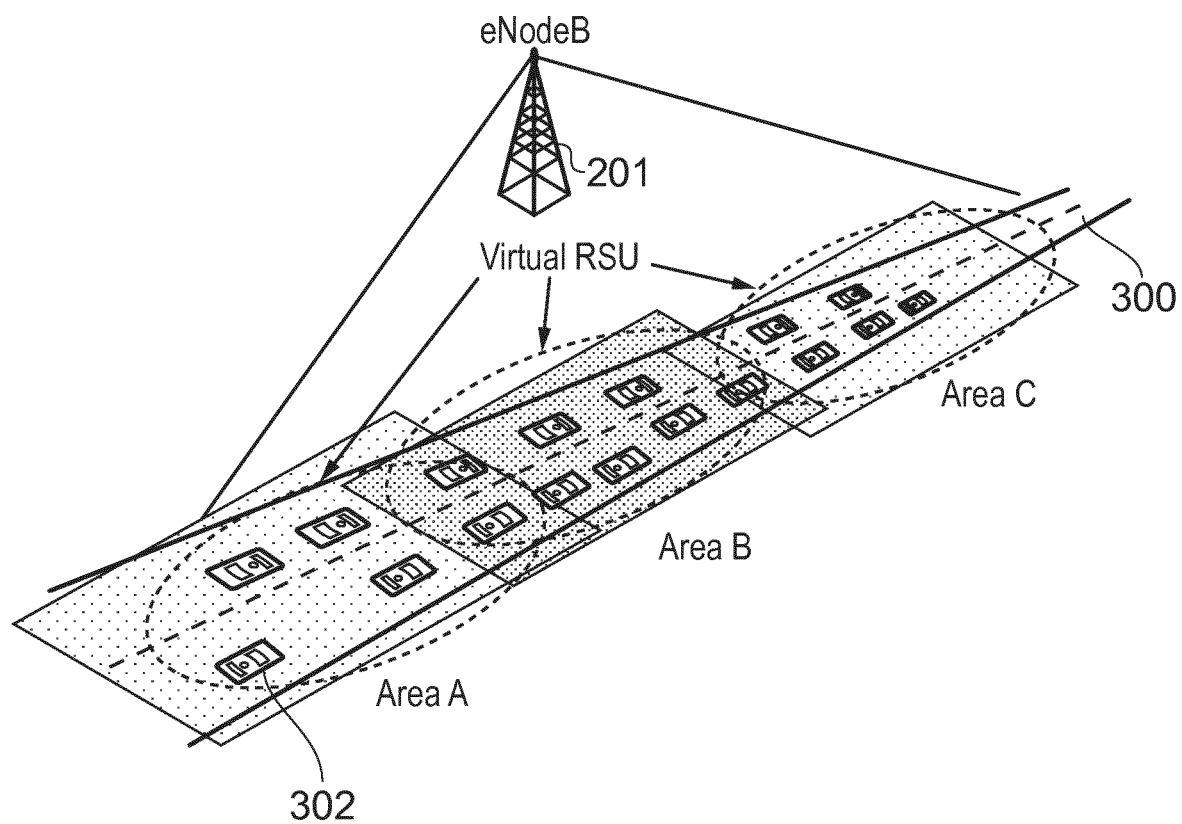
FIG. 3 schematically illustrates a road within the cell of a base station which is separated into a plurality of predetermined geographical regions, according to an embodiment of the present disclosure.

The present disclosure aims to alleviate this problem by providing an arrangement as schematically illustrated in FIG. 3, in which a road 300 within the coverage area (cell) of a base station 201 is separated into a plurality of predetermined geographical regions (or areas) A, B and C, wherein each of these areas is allocated a different set of D2D resources so as to enable V2X communications between vehicles 302 in that area. That is, area A is allocated a first set of D2D radio resources so as to allow V2X communications between vehicles located in area A, area B is allocated a second, different set of D2D radio resources so as to allow V2X communications between vehicles located in area B, and area C is allocated a third, different set of D2D radio resources so as to allow V2X communications between vehicles in area C. The different set of D2D resources in each area is allocated by the base station 201, and has the effect that each area is served by a virtual RSU. As a vehicle UE moves from one area to another, it will start using the D2D resources allocated to the new area and drop the use of the D2D resources allocated to the previous area. These concepts are explained in more detail below.

Figure 4:
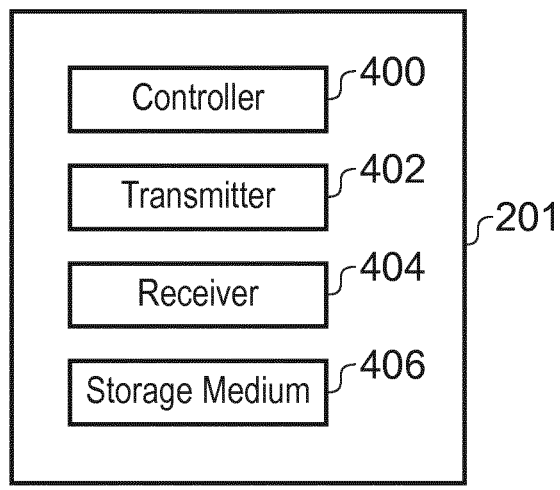
FIG. 4 schematically illustrates a base station according to an embodiment of the present disclosure.

FIG. 4 schematically illustrates a base station 201 according to an embodiment of the present disclosure. The base station 201 comprises a transmitter 402 for transmitting data to a terminal device (or UE), a receiver 404 for receiving data from a terminal device and a storage medium 406 for storing mapping information to be transmitted to a terminal device. The operation of each of the transmitter 402, receiver 404 and storage medium 406 is controlled by the controller 400.

Figure 5:
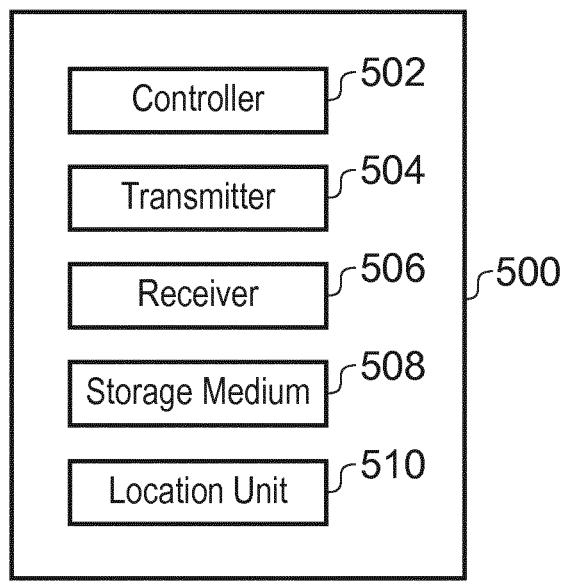
FIG. 5 schematically illustrates a terminal device according to an embodiment of the present disclosure.

FIG. 5 schematically illustrates a terminal device 500 according to an embodiment of the present disclosure. The terminal device comprises a transmitter 504 for transmitting data to a base station or to another terminal device (using a D2D communication technique, for example), a receiver 506 for receiving data from a base station or from another terminal device (again, using a D2D communication technique, for example), a storage medium 508 for storing mapping information received from a base station, and a location unit 510 for determining a geographical location of the terminal device 500. The operation of each of the transmitter 504, receiver 506, storage medium 508 and location unit 510 is controlled by the controller 502. Each of the vehicles 302 shown in FIG. 5 comprises a terminal device 500 so as to allow V2X communications to be carried out.

It will be appreciated that, in an alternative embodiment, the location unit 510 may be located externally to the terminal device 500. For example, the location unit 510 may be comprised as part of a separate, standalone device (such as a standalone GNSS device, not shown) which is configured to perform signalling with the controller 502 of the terminal device via a suitable wired or wireless interface (not shown). In this case, data indicative of the location of the location unit 510 of the standalone device is signalled to the controller 502 via the interface. The externally located location unit 510 and terminal device 500 will still be within vicinity of each other (such as within the same vehicle), however, so as to allow the controller 502 of the terminal device to effectively determine the correct predetermined geographical region (and hence the correct radio resources) to use for V2X communication (as explained below). In other words, the distance between the external location unit and the terminal device is such that, in terms of determining the predetermined geographical location in which the terminal device is located, the location of the external location unit is representative of the location of the terminal device.

In order to establish the different radio resources for use in the different respective areas A, B and C, the base station 201 (based on instructions received from the core network 102, for example) generates mapping information identifying sets of predetermined radio resources and the area (A, B or C) associated with each respective set of predetermined radio resources. The mapping information is then transmitted to each terminal device within the coverage area of the base station 201. Each set of radio resources comprises a suitable number of radio resources (for example, a suitable number of resource blocks in an LTE radio frame) allocated by the base station 201 for use in D2D communication between terminal devices located in the area with which that set of radio resources is associated. Each area may be identified by any suitable means. For example, each area may be determined to be a rectangular portion of the road 300, wherein the rectangle is defined by four sets of geographical coordinates with each set of geographical coordinates defines a corner of the rectangle. The mapping information may take the form of a table such as Table 1.

TABLE 1

| Area | Radio Resources Set |
|---|---|
| A | 1 |
| B | 2 |
| C | 3 |

As can be seen in Table 1, each predetermined geographical area A, B and C is associated with a respective set of radio resources. Specifically, area A is associated with radio resource set 1, area B is associated with radio resource set 2 and area C is associated with radio resource set 3. The radio resources allocated to each set are different so as to avoid radio interference between adjacent areas. It will be appreciated that Table 1 is a simplified example of how each of areas A, B and C is associated with a respective set of radio resources and that, in reality, each of the areas A, B and C will be defined in the mapping information using a suitable coordinate system (for example, global navigation satellite system (GNSS) coordinates) and the specific radio resources (for example, the specific resource blocks of the LTE radio frame) within each set of radio resources 1, 2 and 3 will be defined in the mapping information. It will also be appreciated that although, for simplicity, FIG. 3 and Table 1 only show the three different geographical regions A, B and C for which a set of radio resources is defined, in reality, there will be as many geographical regions defined along the length of the road 300 as is necessary so as to allow V2X communications along the road.

As previously mentioned, the mapping information is transmitted to each terminal device 500 within coverage of the base station 201. In embodiments, this transmission is achieved by broadcasting the mapping information to each terminal device 500. Alternatively, or additionally, the transmission may be on an individual basis where the mapping information is transmitted to each terminal device. As a further alternative or additional feature, after one terminal device receives the mapping information from the base station 201, the terminal device may transmit the mapping information to other terminal devices in its locality. This transmission of mapping information allows each terminal device 500 located within one of the predetermined geographical regions A, B or C to establish the radio resources to use for D2D communication with other terminal devices 500 located within the same predetermined geographical region. This process is illustrated in more detail in FIG. 6.

Figure 6:
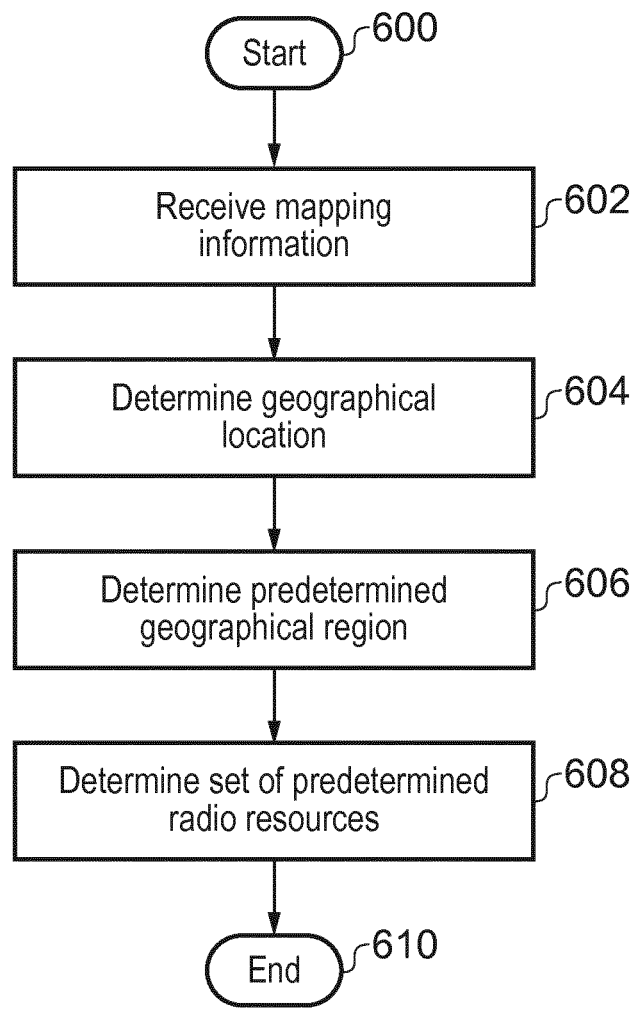
FIG. 6 schematically illustrates a process according to an embodiment of the present disclosure.

The process of FIG. 6 is carried out by each terminal device 500. The process starts at step 600. At step 602, the receiver 506 of the terminal device receives the mapping information from a base station. At step 604, the location unit 510 determines the geographical location of the terminal device. The location unit 510 is operable to determine the geographical location of the terminal device using global navigation satellite system (GNSS) signals, and the geographical location of the terminal device is determined as GNSS coordinates, for example.

At step 606, the controller 502 determines the predetermined geographical region of the received mapping information within which the determined geographical location is located. This step may be carried out using any suitable method. For example, if each of the predetermined geographical areas A, B and C is rectangular and is defined by four sets of GNSS geographical coordinates (these defining the corners of the rectangle, as previously discussed), then the controller 502 will determine the predetermined geographical area within which the terminal device 500 is located by comparing the GNSS coordinates determined by the location unit 510 with the set of four GNSS coordinates for each predetermined geographical area. The controller 502 will then determine the area whose four GNSS coordinates constrain the GNSS coordinates determined by the location unit 510 as being the area within which the terminal device is located.

Once the area within which the terminal device is located has been determined, at step 608, the controller 502 determines the set of predetermined radio resources associated with the determined geographical region using the received mapping information. So, for example, considering the mapping information of Table 1, if the terminal device is determined to be located within area A, then the controller 502 will determine radio resources set "1" as the set of predetermined radio resources, if the terminal device is determined to be located within area B, then the controller 502 will determine radio resources set "2" as the set of predetermined radio resources, and so on. The controller 502 then sets the determined set of predetermined radio resources as the set of radio resources for use in D2D communication with other terminal devices. That is, controller 502 controls the receiver 506 to receive data from other terminal devices using the determined set of predetermined radio resources, controls the transmitter 504 to transmit data to other terminal devices using the determined set of predetermined radio resources. The process then ends at step 610.

Thus, it can be seen that, based on the mapping information transmitted by the base station 201, each terminal device 500 is able to determine the geographical region within which it is located and to determine a set of radio resources associated with that geographical region for performing D2D communication with other terminal devices. Since terminal devices located within the same predetermined geographical region will be using the same set of predetermined radio resources, D2D communication is made possible between these terminal devices. When each of these terminal devices is located in a vehicle 302, D2D communication between vehicles in close proximity to each other along the road 300 is therefore made possible. This allows safety critical information (such as speed, braking, changing lane, turning, etc.) to be efficiently communicated between vehicles using D2D techniques.

It is noted that by transmitting mapping information to each of the terminal devices, each terminal device is able to determine the radio resources which it needs to use for D2D communication with other terminal devices without the need for any additional signalling with the base station 201. Advantageously, this reduces the latency for each terminal device to determine the appropriate set of radio resources for performing D2D communication with other terminal devices in the same geographical region. This reduction in latency is particularly important for the communication of safety critical information between vehicles.

As a vehicle 302 travels from one area to another (for example, from area A to area B), the controller 502 of the terminal device 500 within that vehicle will recognise, based on the mapping information and from the location information generated by the location unit 510, that the terminal device is now located within a new area and should therefore stop using the radio resources allocated to the old area and start using the radio resources allocated to that new area. In this case, the controller 502 will control the transmitter 504 and receiver 506 to start transmitting data to and receiving data from other terminal devices using the radio resources allocated to the new area instead of using the radio resources allocated to the old area.

A problem with this, however, is that if a group of vehicles are travelling together along the road 300, then the vehicle at the front of the group will enter a new area before all the other vehicles in the group have entered that new area. A terminal device of the vehicle at the front of the group will therefore switch to use the radio resources allocated to the new area whilst the terminal devices of other vehicles in the group are still using the radio resources allocated to the old area. There will therefore be a time period during which some vehicles in the group cannot perform D2D communication with other vehicles in the group as the group of vehicles transitions between the old area and the new area. This is undesirable, especially when it is safety critical information which needs to be transmitted. For example, if the first vehicle in a group travels into the new area whilst a second vehicle in the group is still located in the second area, and the first vehicle suddenly brakes, then because the first vehicle is performing D2D communication using the radio resources allocated to the new area whilst the second vehicle is performing D2D communication using the radio resources allocated to the old area, any D2D signalling transmitted by the first vehicle to alert other vehicles in the group of the braking will not be received by the second vehicle. The chance of a collision between the first and second vehicle due to the sudden braking of the first vehicle is therefore increased. The present disclosure provides a number of ways in which this problem may be alleviated, as described with reference to FIGS. 7A-7E.

Figure 7A:
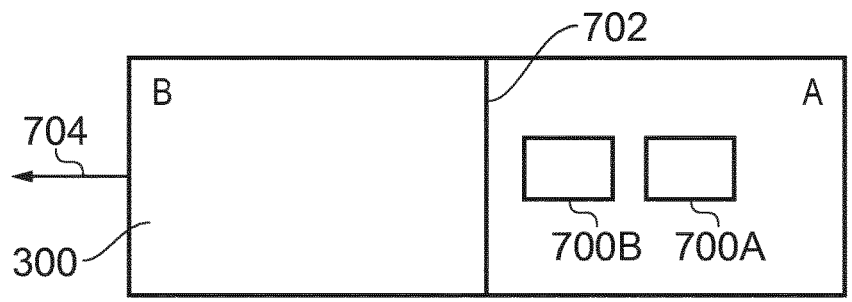
FIGS. 7A-7E schematically illustrates various arrangements for managing the transfer of terminal devices from one predetermined geographical region to another, according to an embodiment of the present disclosure.

FIG. 7A schematically shows an initial situation when two vehicles 700A and 700B are both within area A of road 300. The area A is separated from the area B by a boundary 702. In this case, the terminal devices of both vehicles will use the radio resources allocated to area A, and therefore D2D communication is possible between vehicle 700A and vehicle 700B. In each of FIGS. 7A-7E, vehicles 700A and 700B are travelling along the road 300 in the direction of arrow 704.

Figure 7B:
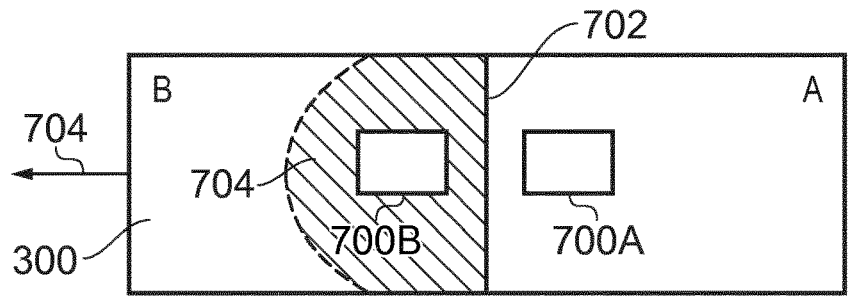

FIG. 7B schematically shows a situation in which vehicle 700B has crossed the boundary 702 so as to enter area B where as vehicle 700A has not yet crossed the boundary 702 and is therefore still located within area A. As previously discussed, if the terminal device of vehicle 700B stops using the radio resources allocated to area A and starts using the radio resources allocated to area B, then D2D communication with vehicle 700A will not be possible until vehicle 700A has also crossed the boundary 702 and has started using the radio resources allocated to area B. There is thus a time period in which D2D communication between vehicle 700A and vehicle 700B is not possible.

In order to alleviate this problem, in FIG. 7B, the terminal device of vehicle 700B continues to use the radio resources allocated to area A instead of or in addition to the radio resources allocated to area B for a limited time period. For example, the terminal device of vehicle 700B may continue to use the radio resources allocated to area A for a predetermined time period, the predetermined time period being determined in advance based on how long it is expected to take between a first vehicle in a group (vehicle 700B, in this case) entering a new area and the last vehicle in the group entering the new area (vehicle 700A, in this case). Such a time period may be determined on the basis of experimental or modelled traffic data or the like. As another example, the terminal device of vehicle 700B may continue to use the resources allocated to area A until D2D signalling with vehicle 700A which was in progress at the time that vehicle 700B crossed the boundary 702 has been completed. For example, if vehicle 700B is braking as it crosses the boundary 702, then D2D data which is transmitted to vehicle 700A during the period of braking so as to inform vehicle 700A that vehicle 700B is braking will continue to being transmitted using the radio resources allocated to area A even when vehicle 700B has entered area B. This allows vehicle 700A to be made aware that vehicle 700B is braking for the entire period of braking and to take appropriate action (for example, vehicle 700A may slow down and/or change to a different traffic lane of road 300). Once vehicle 700B has stopped braking, this is signalled to vehicle 700A using the radio resources allocated to area A, and the D2D communication is completed. At this point, the terminal device of vehicle 700A will stop the use of the radio resources allocated to area A, since it is now safe to do so.

In an alternative example, the time period for which vehicle 700B continues to use radio resources allocated to area A after it has entered area B is determined based on the time taken for the vehicle 700A to also enter area B. Such an arrangement may be implemented, for example, by the terminal device of vehicle 700A signalling to the terminal device of vehicle 700B as when vehicle 700A crosses the boundary 702 and enters area B. In this case, as vehicle 700B crosses the boundary 702 and enters area B, it will continue performing D2D communication using the radio resources allocated to area A until it is notified by vehicle 700A that vehicle 700A has now entered area B. The notification signalling (or message) from vehicle 700A may be carried out using the radio resources allocated to area A (after which, both vehicles 700A and 700B switch to using the radio resources allocated to area B) or, alternatively, may be carried out using the radio resources allocated to area B (in which case, vehicle 700A will switch to use the radio resources allocated to area B prior to transmitting the notification signalling to vehicle 700B). It will be appreciated that this example may be extended so that, for a group of vehicles comprising more than two vehicles travelling from area A to area B, each vehicle in the group will continue performing D2D communications using the radio resources allocated to area A until the last vehicle in the group has entered area B and has notified the other vehicles in the group that this is the case. At this point, all vehicles will switch to perform D2D communication with the radio resources allocated to area B.

In the arrangement of FIG. 7B, since the radio resources allocated to area A continue to be used by vehicle 700B for a limited time after it has entered area B, the effect of this is provide an area 704 of temporary extension of area A into area B for the vehicle 700B. In the case that the terminal device of vehicle 700B is configured to temporarily perform D2D communication using both the radio resources allocated to area A and the radio resources allocated to area B, then the area 704 of temporary extension will further be an area of overlap between areas A and B for vehicle 700B. To be clear, the areas A and B remain rigidly defined in the mapping information. However, due to the terminal device of vehicle 700B temporarily continuing to use the radio resources allocated to area A when it has entered area B (so as to allow continued D2D communication with vehicle 700A prior to vehicle 700A also entering area B), the effect of this, from the perspective of vehicle 700B, is to temporarily extend area A for vehicle 700B.

Figure 7C:
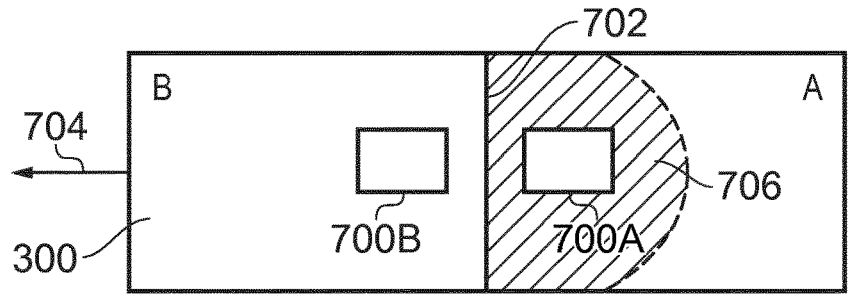

FIG. 7C schematically shows an alternative arrangement in which, instead of vehicle 700B temporarily waiting to switch to the radio resources allocated to area B after crossing the boundary 702 from area A to area B, vehicle 700B, upon crossing the boundary 702, transmits notification signalling to vehicle 700A so as to instruct vehicle 700A to start using the radio resources allocated to area B. In this case, vehicle 700A will start using the radio resources allocated to area B before it has reached the boundary 702 and entered area B. The notification signalling (or message) from vehicle 700B is carried out using the radio resources allocated to area A. After this, both vehicles 700A and 700B switch to using the radio resources allocated to area B. It will be appreciated that this example may be extended so that, for a group of vehicles comprising more than two vehicles travelling from area A to area B, once the first vehicle in the group has entered area B, notification signalling is transmitted from this first vehicle to each other each vehicle in the group so as to instruct these other vehicles (which are still located in area A) to start performing D2D communication using the radio resources allocated to area B. At this point, all vehicles will switch to perform D2D communication with the radio resources allocated to area B.

In the arrangement of FIG. 7C, since the radio resources allocated to area B start being used by vehicle 700A prior to it actually entering area B, the effect of this is provide an area 706 of temporary extension of area B into area A for the vehicle 700B. It may further be the case that the terminal device of vehicle 700A is configured to temporarily perform D2D communication using both the radio resources allocated to area A and the radio resources allocated to area B following the receipt of notification signalling from vehicle 700B and prior to the entry of vehicle 700A into area A. In this case, the area 706 of temporary extension will further be an area of overlap between areas A and B for vehicle 700A. To be clear, the areas A and B again remain rigidly defined in the mapping information. However, due to the terminal device of vehicle 700A starting to use the radio resources allocated to area B whilst vehicle 700A is still located within area A (so as to allow continued D2D communication with vehicle 700B prior to vehicle 700A also entering area B), the effect of this, from the perspective of vehicle 700A, is to temporarily extend area B for vehicle 700A.

Figure 7D:
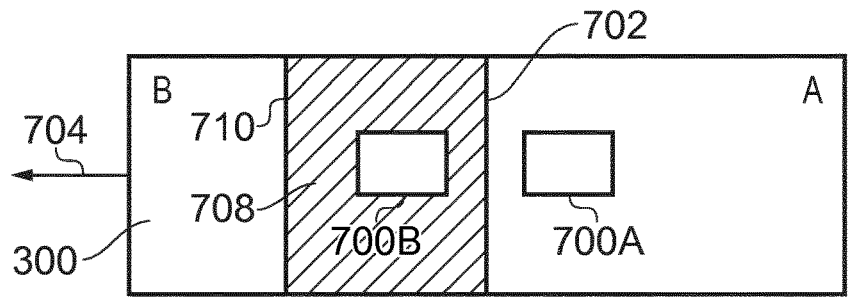

FIG. 7D schematically shows an alternative arrangement in which areas A and B have a fixed overlapping region 708 between them. The overlapping region 708 is defined between boundaries 702 and 710, and when within the overlapping region 708, each terminal device is able to perform D2D communication using either the radio resources allocated to area A or the radio resources allocated to area B. Such overlapping areas may be defined in the mapping information received from the base station 201. An example of such mapping information is Table 2.

TABLE 2

| Area | Radio Resources Set |
|---|---|
| A | 1 |
| Overlap A, B | 1, 2 |
| B | 2 |
| Overlap B, C | 2, 3 |
| C | 3 |

In this case, the overlapping areas between each of the areas A, B and C are included as additional predetermined geographical regions in the mapping information, and have associated respective sets of radio resources. In particular, the overlapping area between areas A and B (defined as "Overlap A, B" in Table 2) is allocated both radio resources set 1 (this being the set of radio resources allocated for area A) and radio resources set 2 (this being the set of radio resources allocated for area B), and the overlapping area between areas B and C (defined as "Overlap B, C" in Table 2) is allocated both radio resources set 2 (this being the set of radio resources allocated for area B) and radio resources set 3 (this being the set of radio resources allocated for area C). Thus, whenever a terminal device is located within one of the overlapping areas, the controller 502 of the terminal device will control the transmitter 504 and receiver 506 of the terminal device to perform D2D communications with other terminal devices using both sets of radio resources allocated to the areas which are overlapping in the overlap area.

Thus, in the example of FIG. 7D, the vehicle 700B will first enter the overlapping region 708. The terminal device of the vehicle 700B will thus switch to use both the radio resources allocated to area A and the radio resources allocated to area B for performing D2D communication with the terminal devices of other vehicles. This allows the vehicle 700B to continue performing D2D communication with vehicle 700A, which is still located within area A (and which will thus perform D2D communication using the radio resources allocated to area A), as well as to communicate with other vehicles located in area B (and which will thus perform D2D communication using the radio resources allocated to area B). At a later time, vehicle 700B will leave the overlapping region 708 and enter area B. At this point, the terminal device of vehicle 700B will switch to perform D2D communication using the radio resources allocated to area B only. At the same time, however, vehicle 700A will enter the overlapping region 708, meaning that the terminal device of vehicle 700A switches so as to perform D2D communication using both the radio resources allocated to area A and the radio resources allocated to area B. This allows the vehicle 700A to continue performing D2D communication with vehicle 700A, which is now located within area B (and which will thus perform D2D communication using the radio resources allocated to area B), as well as to communicate with other vehicles still located in area A (and which will thus perform D2D communication using the radio resources allocated to area A). At a further later time, vehicle 700A will then also enter area B, meaning that the terminal device of vehicle 700A switches to perform D2D communication using the radio resources allocated to area B only. At this time, both vehicles 700B and 700A are now located in area B, and thus D2D communication between them may continue using only the radio resources allocated to area B.

Thus, by using the overlapping region 708 between adjacent areas as described, it is possible to maintain D2D communications between vehicles 700A and 700B as the vehicles enter a new area at different points in time. Firstly, when both vehicles are in located in area A, D2D communication is performed between them using the radio resources allocated to area A. Next, when vehicle 700B enters the overlapping region 708 whilst vehicle 700A is still located within area A, D2D communication is still performed between them using the radio resources allocated to area A. Next, when vehicle 700B enters area B whilst vehicle 700A enters the overlapping region 708, D2D communication is performed between them using the radio resources allocated to area B. Finally, when vehicle 700A also enters area B, D2D communication is still performed between them using the radio resources allocated to area B. D2D communication between vehicles 700A and 700B is thus uninterrupted despite the vehicles entering a new area at different times.

It is noted that although the overlapping regions between areas may be included as additional predetermined geographical areas in the mapping information (as exemplified in Table 2), in an alternative embodiment, the predetermined geographical areas are the same as those shown in Table 1, and the terminal devices 500 themselves determine the overlapping regions 708. For example, the controller 502 of each terminal device may determine the overlapping region 708 as a sub area of area B, and cause the transmitter 504 and receiver 506 to perform D2D communication using both the radio resources allocated to the area A and the radio resources allocated to the area B during the time in which the vehicle within which that terminal device is comprised is located within the overlapping region. In this case, when a vehicle is located in area A, D2D communication will be performed using the radio resources allocated to area A. Next, when the vehicle has crossed the boundary 702 into area B, but has not yet reached the boundary 710, D2D communication will be performed using both the radio resources allocated to area A and the radio resources allocated to area B. Finally, when the vehicle has crossed the boundary 710, D2D communication will be performed using the radio resources allocated to area B only. Advantageously, this allows continuous D2D communication between vehicles 700A and 700B as they transition at different times between areas A and B through use of an overlapping region 708, even though the overlapping region 708 itself is not defined as a predetermined geographical area in the mapping information.

Figure 7E:
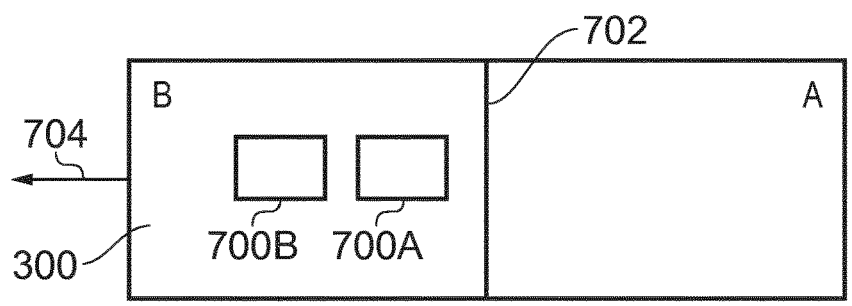

FIG. 7E schematically shows the arrangement when both vehicles 700A and 700B have successfully transitioned to the area B. In this case, both vehicles perform D2D communication using the radio resources allocated to area B.

It will be appreciated from the foregoing description that the present disclosure makes the merging of D2D enabled vehicles into groups simple, since by entering a particular predetermined geographical area all the terminal devices of those vehicles by default switch to listen to the radio resources allocated to that area (based on the mapping information). In this way, there is no need for terminal devices to discover other terminal devices approaching.

Also, groups moving at different speeds start to use separate D2D resource allocations once they are far enough apart from one another and occupy different predetermined geographical areas of the road.

For example, in the arrangement of FIG. 7B, if vehicle 700A does not enter the area B within the limited time period for which vehicle 700B temporarily continues to use the radio resources allocated to area A, then after the limited time period has expired, vehicle 700B uses the radio resources allocated to area B only whereas vehicle 700A uses the radio resources allocated to area A only. D2D communication between vehicles 700A and 700B is thus no longer possible, and the vehicles are no longer in the same group. In the case that the terminal device of vehicle 700B waits for signalling from the terminal device of vehicle 700A prior to switching to use the radio resources allocated to area B only, then if such signalling is not received within a predetermined time period starting at the point that vehicle 700B enters area B (as measured by the controller 502 of the terminal device of vehicle 700B, and as will occur when the physical distance between vehicles 700A and 700B exceeds the propagation distance of D2D signalling between the vehicles), then the terminal device of vehicle 700B will switch to use the radio resources allocated to area B only without receiving such signalling. This allows vehicles 700A and 700B to split into different groups (with vehicle 700B using the radio resources allocated to area B and vehicle 700A using the radio resources allocated to area A) when they become separated by a certain distance.

As another example, in the arrangement of FIG. 7C, if vehicle 700A does not receive the D2D signalling from vehicle 700B to switch to use the radio resources allocated to area B (again, as will occur when the physical distance between vehicles 700A and 700B exceeds the propagation distance of D2D signalling between the vehicles), then vehicle 700B will use the radio resources allocated to area B only where as vehicle 700A will continue to use the radio resources allocated to area A only. This again allows vehicles 700A and 700B to split into different groups (with vehicle 700B using the radio resources allocated to area B and vehicle 700A using the radio resources allocated to area A) when they become separated by a certain distance.

As another example, in the arrangement of FIG. 7D, if vehicle 700B leaves the overlapping region 708 and enters area B prior to vehicle 700A leaving area A and entering the overlapping region 708, then D2D communication between vehicles 700A and 700B will be lost (since vehicle 700B in area B will use the radio resources allocated to area B only and vehicle 700A in area A will use the radio resources allocated to area A only). This will occur when the vehicles 700A and 700B are separated by a distance greater than the length of the overlapping region 708 (that is, the distance between the boundary regions A and B).

It will thus be appreciated that by allocating difference sets of radio resources to the predetermined geographical regions along the road 300 using the mapping information, groups of vehicles (a group being defined as vehicles using the same set of radio resources) are dynamically created and changed as vehicles enter and leave each predetermined geographical region. This allows a vehicle travelling along the road 300 to exchange D2D signalling with the other vehicles within a certain proximity to it (as determined by the size of each predetermined geographical region and the propagation distance of the D2D signalling in each predetermined geographical region), thus allowing safety critical messages to be transmitted to these other vehicles. Advantageously, due to the low latency associated with the use of the mapping information by each terminal device, this arrangement works well even for vehicles travelling at high speed (for example, on motorways).

It will be appreciated that different portions of the same road may be within the cells of different base stations. In order to avoid a delay in determining the set of radio resources allocated to a predetermined geographical region within the cell of a new base station as a vehicle newly enters such a cell, the mapping information transmitted from each base station may include at least a portion of the mapping information for neighbouring cells. This allows a vehicle travelling between cells to know the radio resources to use for D2D communication without having to wait for handover between the cells to be completed. For example, as a vehicle travels from an area D within the cell of a first base station to an area E within the cell of a second base station, the mapping information transmitted by the first base station will identify the area E and the radio resources allocated to area E. The terminal device of the vehicle thus knows the radio resources to switch to as it enters area E prior to handover between the first and second base stations being completed. This provides a smooth transition between cells.

As described above, the predetermined geographical regions may overlap with each other. Furthermore, there may be predetermined common radio resources which are used by more than one adjacent predetermined geographical region. Such common radio resources may be used for transmitting the most safety critical messages (such as messages relating to sudden braking, for example), meaning that all vehicles within the propagation distance of D2D signalling using the common radio resources will receive these messages, regardless of the specific predetermined geographical region within which they are located. Such shared radio resources may also be used, for example, for transmitting signalling from a first vehicle a second vehicle so as to instruct a switch in the set of radio resources used by the second vehicle. For example, in the arrangement of FIG. 7B, vehicle 700A may transmit a message to vehicle 700B to instruct vehicle 700B to switch to use the radio resources allocated to area B (as previously discussed) using common radio resources allocated to areas A and B. Similarly, as another example, in the arrangement of FIG. 7C, vehicle 700B may transmit a message to vehicle 700A to instruct vehicle 700A to switch to use the radio resources allocated to area B (as previously discussed) using common radio resources allocated to areas A and B. It is noted that regardless of the extent of overlap and the uniqueness of each set of radio resources, the planning of the predetermined geographical areas will start from estimating the needed size and number of such areas.

In the case that the D2D communication used between terminal devices as described is LTE D2D communication, it is noted that the nature of LTE D2D communications is that all the communicating terminal devices must synchronise to a common synchronisation source. This may be the serving base station or even a GPS clock, as has been described in the applicant's co-pending European patent application EP 15178910.4. The extent of D2D devices being synchronised to communicate with one another has an impact on the reliability D2D communications. On a motorway, for example, vehicles cover an area extending several miles, in which case it would be impracticable to attempt propagating a synchronisation signal in a multi-hop fashion from one device to another. It is therefore easier to establish the synchronisation area over a smaller footprint. Advantageously, such a smaller footprint is provided by the predetermined geographical areas as described, thus allowing a reliable D2D communication between vehicles travelling in the same predetermined geographical area.

The inherent limitations in the propagation distance of LTE D2D signalling and the challenges that multi hopping may cause to latency performance set a limitation for the size of each predetermined geographical area. For example, where direct D2D communication is needed between any two vehicles, the maximum distance between the transmitter and receiver due to these limitations is approximately 200-300 metres. This sets the maximum extent of any group of moving D2D terminal devices that need to communicate with one another. Thus, segmenting a stretch of roadway into predetermined geographical regions of approximately 200-300 metres in length will implicitly limit the size of connected groups to that size. That is, having predetermined geographical regions of approximately 200-300 metres in length along a road approaches a desirable balance between the size of each group of vehicles and the reliability of D2D communications between vehicles.

Due to the free-space path loss inherent in wireless communications, radio resources may be reused at a certain distance without interference to other devices using that resource independently. That is, the D2D radio resources allocated to area A may be used again in a different area of road 300 sufficiently far from area A such that interference between area A and this other area is avoided.

One further aspect that may be managed by the present disclosure is the split of radio resources in each predetermined geographical area between vehicle D2D traffic (as described above) and legacy uplink and downlink communications (for example, conventional voice or messaging communications). Vehicular traffic on roads has peaks of congestion and periods of quiet traffic. Assigning the same amount of radio resources to vehicle D2D traffic regardless of the time of day would therefore waste resources or cause capacity constraints during peak usage. Thus, a base station 201 may update its mapping information depending on the expected demand for radio resources at different times. For example, when vehicle traffic is low for a certain predetermined geographical area in the mapping information, signalling (from the core network 102, for example) is used to instruct the base station 201 to allocate less radio resources to that area in the mapping information. On the other hand, at a different time, when vehicle traffic is high for that area, signalling (again, from the core network 102, for example) can be used to instruct the base station 201 to allocate more radio resources to that area in the mapping information. The updated mapping information is then transmitted to the terminal devices.

Today's LTE specifications use, for example, paging messages to inform terminal devices about the need to read system information that has been updated. In an embodiment, the mapping information can thus be stored as part of this system information, and the terminal devices in a cell can be prompted to read that information following an update of the mapping information through existing tools provided by the specifications. Alternatively, radio resource control (RRC) broadcast signalling may be used to provide updated mapping information to the terminal devices. When such broadcasting is used, it is again only necessary to prompt all the terminal devices to read the broadcast message following an update of the mapping information. It is also envisaged that other methods such as multicasting could be used to transmit updated mapping information to terminal devices.

Figure 8:
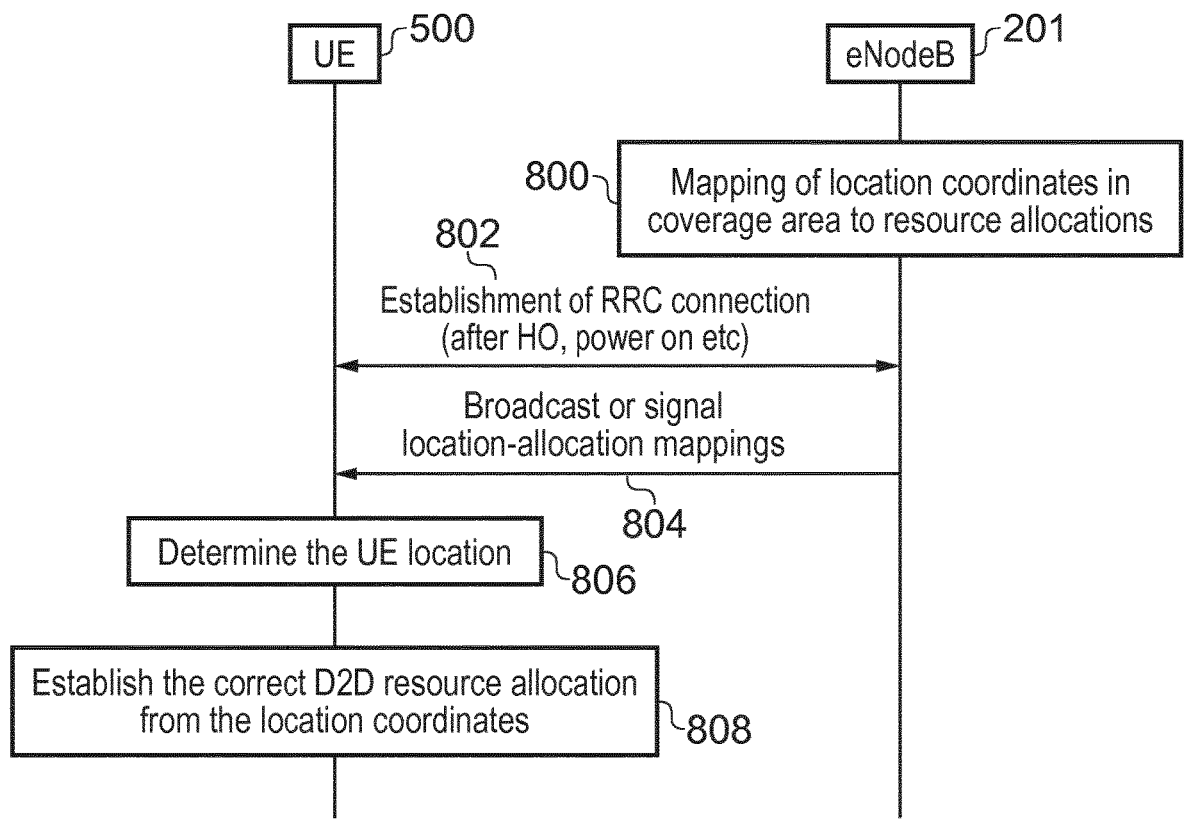
FIG. 8 schematically illustrates signalling carried out between a terminal device and a base station, according to an embodiment of the present disclosure.

An example of the signalling carried out between a terminal device 500 and a base station 201 so as to allow the terminal device 500 to determine which radio resources to use for D2D signalling is described with reference to FIG. 8. At step 800, a predetermined set of radio resources is allocated to each respective predetermined geographical region, and these allocations are stored as the mapping information in the storage medium 406. At step 802, an RRC connection is established between the base station 201 and terminal device 500. At step 804, the mapping information is broadcast to the terminal device 500 and stored in the storage medium 508. At step 806, the location unit 510 determines the geographical location of the terminal device 500. Finally, at step 808, the controller 502 determines the predetermined geographical region of the mapping information within which the geographical location determined by the location unit 501 is located, and determines the set of predetermined radio resources associated with the determined geographical region using the received mapping information. These radio resources are then used by the terminal device 500 for performing D2D communication with other terminal devices.

It is noted that once a terminal device has determined the set of predetermined radio resources to use for D2D communication, a scheduling operation must take place. The scheduling operation determines which specific radio resources in the determined set of predetermined radio resources are to be used by the terminal device. In terms of scheduling operations in D2D, there are two types of scheduling operation (also known as a resource allocation operation or resource scheduling operation). These are described in the 3GPP specification TS36.300 version 12.5.0. The first one is eNodeB Scheduled resource allocation (mode 1). The second one is UE autonomous resource selection (mode 2). eNodeB Scheduled resource allocation means that the eNodeB allocates one-shot radio resources which are followed by the UE. This is suitable for dense areas of traffic (in which there are many terminal devices per unit area) because it is contention free. UE autonomous resource selection means that the eNodeB allocates the resource pool in advance and the UE selects the specific resources autonomously from the allocated resource pool. This is suitable for non-dense areas (in which there are fewer terminal devices per unit area, such as rural areas) because of the lower possibility of contention in these areas (due to the low traffic). The mapping information may include the direction of which type of resource allocation/scheduling operation should be selected in a particular geographical region.

As previously mentioned, a terminal device 500 in a vehicle may know which D2D radio resources to use based on information received from a road side unit (RSU). However, for portions of road which do not have an RSU installed, radio resources can be allocated based on mapping information transmitted from a base station 201, as has been described in the present disclosure.

Figure 9:
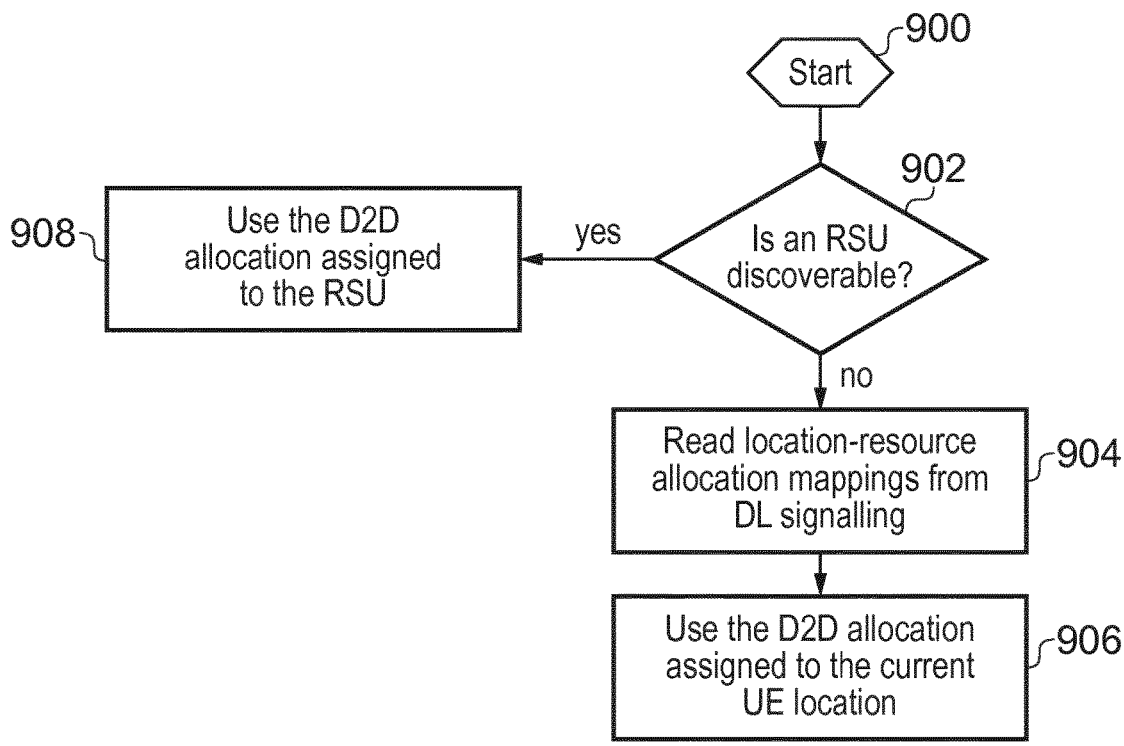
FIG. 9 depicts a decision process of a terminal device according to an embodiment of the present disclosure.

FIG. 9 depicts the decision process of a terminal device 500 that intends to engage on D2D V2X communication. The process starts at step 900. At step 902, it is determined whether an RSU is discoverable. If an RSU is discoverable, then the process moves on to step 908, in which the terminal device uses the D2D radio resources allocated by the RSU. On the other hand, if an RSU is not discoverable, then the process moves on to step 904, in which the mapping information is read from the base station 201 to which the terminal device 500 is connected. At step 906, the terminal device 500 then uses the D2D radio resources specified in the mapping information at step 906. In this way, the base station 201 acts as a virtual RSU for the predetermined geographical regions determined in the mapping information.

In an alternative embodiment, instead of the mapping information being transmitted to each of the terminal devices 500 via a base station 201, the mapping information may be provided to the storage medium 508 of each terminal device via an alternative method. For example, the mapping information may be downloaded by a terminal device from the internet (either via the network 100 or via alternative means such as a wireless local area network (WLAN) to which the terminal device 500 is connected), transmitted to the terminal device via Bluetooth® signalling from an external device (such as personal computer, tablet computer or the like) or provided in a portable storage medium such as a Universal Serial Bus (USB)® flash drive, Secure Digital (SD)® card, Sony® Memory Stick or the like. In one embodiment, the storage medium 508 itself may be a portable storage medium. In each of these cases, the mapping information is stored in the storage medium 508 prior to the need for the terminal device 500 to access radio resources associated with a predetermined geographical region (for example, prior to a vehicle undertaking a journey).

In the case of this alternative embodiment, the mapping information may be constant. That is, the radio resources allocated to each predetermined region may not change. Advantageously, this allows the mapping information to be provided to a terminal device 500 once, and then the mapping information may be referred to for future journeys without the user having to update the mapping information. Alternatively, the mapping information may change, but may not change often. For example, the mapping information may change only in response to changes to the way that radio resources are used in particular areas, as decided by network providers and/or governing bodies. Such changes may only occur over periods of months or years, for example. In this case, a user only needs to update the mapping information of a terminal device 500 after such a change. Alternatively still, the mapping information may associate a plurality of sets of radio resources with each predetermined geographical region, as exemplified in Table 3 below.

TABLE 3

| Area | Radio Resources Set |
|------|---------------------|
| A    | 1, 4                |
| B    | 2, 5                |
| C    | 3, 6                |

In Table 3, it can be seen that area A is allocated with radio resource sets 1 and 4, area B is allocated with radio resource sets 2 and 5, and area C is allocated with radio resource sets 3 and 6. Signalling from the base station 201 then indicates which of the radio resources a terminal device 500 is to use when in a particular area, depending on the time of day, time of week, or any other suitable parameter. To be clear, in this case, the mapping information is already stored in the storage medium 508 of the terminal device (having been downloaded from the internet, received via Bluetooth® or provided via a portable storage medium, for example, as previously described). The signalling from the base station 201 then indicates which set of radio resources in the stored mapping information is to be used for each predetermined geographical region.

For example, at a first time of day (in which there is a higher number of vehicles on the road, for example, and thus where more radio resources should be allocated for V2X communications), the base station 201 may perform signalling with each terminal device 500 indicating that radio resource set 1 should be used for area A, radio resource set 2 should be used for area B and radio resource set 3 should be used for area C. On the other hand, at a second time of day (in which there is a lower number of vehicles on the road, for example, and thus where less radio resources should be allocated for V2X communications), the base station will perform signalling with each terminal device 500 indicating that radio resource set 4 should be used for area A, radio resource set 5 should be used for area B and radio resource set 6 should be used for area C. In this case, radio resource sets 1, 2 and 3 comprise a larger number of radio resources to be allocated for V2X communications than radio resource sets 4, 5 and 6, respectively. Advantageously, this reduces the amount of information which needs to be transmitted from the base station 201, since the base station 201 must transmit only an indicator of which predetermined set of radio resources is to be used for each predetermined geographical region rather than transmit the mapping information in its entirety. The processing and signalling overhead associated with the mapping information is therefore reduced.

Various embodiments of the present technique are described with reference to the following numbered clauses:

1. A first terminal device for use in a wireless telecommunications system, the first terminal device comprising:
   a receiver;
   a transmitter;
   a storage medium operable to store mapping information, the mapping information identifying sets of predetermined radio resources and a predetermined geographical region associated with each respective set of predetermined radio resources; and
   a controller operable to:
   receive a geographical location of the terminal device, the geographical location of the terminal device being determined by a location unit;
   determine the predetermined geographical region of the received mapping information within which the determined geographical location is located;
   determine the set of predetermined radio resources associated with the determined geographical region using the received mapping information;
   control the receiver to receive signals from a second terminal device using the determined set of predetermined radio resources; and
   control the transmitter to transmit signals to the second terminal device using the determined set of predetermined radio resources.

2. A first terminal device according to clause 1, wherein:
   the receiver is operable to receive the mapping information from a base station and the controller is operable to store the received mapping information in the storage medium.

3. A first terminal device according to any preceding clause, wherein the first terminal device comprises the location unit.

4. A first terminal device according to any preceding clause, wherein the controller is operable to:
   determine, based on the geographical location of the first terminal device determined by the location unit, when the location of the first terminal device changes from being within a first predetermined geographical region of the mapping information to being within a second predetermined geographical region of the mapping information;

determine the set of predetermined radio resources associated with the second predetermined geographical region using the mapping information;

control the receiver to switch from receiving signals from a second terminal device using the set of predetermined radio resources associated with the first predetermined geographical region to receiving signals from the second terminal device using the set of predetermined radio resources associated with the second predetermined geographical region; and control the transmitter to switch from transmitting signals to the second terminal device using the set of predetermined radio resources associated with the first predetermined geographical region to transmitting signals to the second terminal device using the set of predetermined radio resources associated with the second predetermined geographical region.

5. A first terminal device according to clause 4, wherein there is a region of spatial overlap between the first predetermined geographical region and the second predetermined geographical region, and the controller is operable to:

determine, based on the geographical location of the first terminal device determined by the location unit, when the first terminal device is located in the region of spatial overlap;

control the receiver to begin receiving signals from a second terminal device using the set of predetermined radio resources associated with the second predetermined geographical region in addition to receiving signals from the second terminal device using the set of predetermined radio resources associated with the first predetermined geographical region; and control the transmitter to begin transmitting signals to the second terminal device using the set of predetermined radio resources associated with the second predetermined geographical region in addition to transmitting signals to the second terminal device using the set of predetermined radio resources associated with the first predetermined geographical region.

6. A first terminal device according to clause 4, wherein the controller is operable to:

control the receiver to continue to receive signals from a second terminal device using the set of predetermined radio resources associated with the first predetermined geographical region until the reception of the signals has been completed; and control the transmitter to continue to transmit signals to the second terminal device using the set of predetermined radio resources associated with the first predetermined geographical region until the transmission of the signals has been completed.

7. A first terminal device according to clause 4, wherein the controller is operable to:

control the receiver to continue to receive signals from a second terminal device using the set of predetermined radio resources associated with the first predetermined geographical region until a predetermined time period has elapsed; and control the transmitter to continue to transmit signals to the second terminal device using the set of predetermined radio resources associated with the first predetermined geographical region until the predetermined time period has elapsed.

8. A first terminal device according to clause 4, wherein when the controller determines that the location of the first terminal device has changed from being within the first predetermined geographical region to being within the second predetermined geographical region, the controller is operable to control the transmitter to transmit a message to a second terminal device located in the first predetermined geographical region instructing the second terminal device to switch from receiving signals from and transmitting signals to the first terminal device using the set of predetermined radio resources associated with the first geographical region to receiving signals from and transmitting signals to the first terminal device using the set of predetermined radio resources associated with the second geographical region.

9. A first terminal device according to clause 4, wherein when the controller determines that the location of the first terminal device has changed from being within the first predetermined geographical region to being within the second predetermined geographical region, the controller is operable to control the transmitter to transmit a message to a second terminal device located in the second predetermined geographical region instructing the second terminal device to switch from receiving signals from and transmitting signals to the first terminal device using the set of predetermined radio resources associated with the first geographical region to receiving signals from and transmitting signals to the first terminal device using the set of predetermined radio resources associated with the second geographical region.

10. A first terminal device according to clause 4, wherein:

the receiver is operable to receive a message from a second terminal device located in the second predetermined geographical region instructing the first terminal device to switch from receiving signals from and transmitting signals to the second terminal device using the set of predetermined radio resources associated with the first geographical region to receiving signals from and transmitting signals to the second terminal device using the set of predetermined radio resources associated with the second geographical region; and the controller is operable to, in response to the receiver receiving the message:

control the receiver to switch from receiving signals from the second terminal device using the set of predetermined radio resources associated with the first predetermined geographical region to receiving signals from the second terminal device using the set of predetermined radio resources associated with the second predetermined geographical region; and control the transmitter to switch from transmitting signals to the second terminal device using the set of predetermined radio resources associated with the first predetermined geographical region to transmitting signals to the second terminal device using the set of predetermined radio resources associated with the second predetermined geographical region.

11. A first terminal device according to clause 10, wherein the receiver is operable to receive the message when the first terminal device is located in the first predetermined geographical region.

12. A first terminal device according to clause 10, wherein:

the receiver is operable to receive the message when the first terminal device is located in the second predetermined geographical region; and the controller is operable to delay controlling the receiver to switch from receiving signals from the second terminal device using the set of predetermined radio resources associated with the first predetermined geographical region to receiving signals from the second terminal device using the set of predetermined radio resources associated with the second predetermined geographical region and to delay controlling the transmitter to switch from transmitting signals to the second terminal device using the set of predetermined radio resources associated with the first predetermined geographical region to transmitting signals to the second terminal device using the set of predetermined radio resources associated with the second predetermined geographical region until the receiver has received the message.

13. A first terminal device according to any preceding clause, wherein the sets of predetermined radio resources are for device-to-device (D2D) communication between the first terminal device and second terminal device.

14. A first terminal device according to any preceding clause, wherein the set of predetermined radio resources is the same for a first predetermined geographical region of the received mapping information and a second predetermined geographical region of the received mapping information, the first and second predetermined geographical regions being separated by a distance such as to avoid radio interference between the first and second predetermined geographical regions.

15. A first terminal device according to any preceding clause, wherein each predetermined geographical region identified in the mapping information comprises a portion of a road.

16. A first terminal device according to clause 2, wherein the receiver is operable to receive the mapping information as information which is broadcast from the base station.

17. A first terminal device according to any preceding clause, wherein the controller is operable to control the transmitter to transmit the mapping information to a second terminal device.

18. A transport vehicle comprising a first terminal device according to any preceding clause.

19. A base station for use in a wireless telecommunications system, the base station comprising:
a controller operable to allocate sets of predetermined radio resources to each of respective predetermined geographical regions; and
a transmitter operable to transmit mapping information to each of a plurality of terminal devices, the mapping information identifying each set of predetermined radio resources and its associated predetermined geographical region, wherein each terminal device is operable to determine its geographical location, determine the predetermined geographical region of the received mapping information within which the determined geographical location is located, determine the set of predetermined radio resources associated with the determined geographical region using the mapping information, and perform communication with another one of the terminal devices located in the determined geographical region using the determined set of predetermined radio resources.

20. A base station according to clause 19, wherein the mapping information identifies sets of predetermined radio resources associated with respective predetermined geographical regions located within the cell of a neighbouring base station.

21. A base station according to either one of clauses 19 or 20, wherein:
the controller is operable to change the amount of predetermined radio resources allocated to one or more of the respective predetermined geographical regions in accordance with an expected demand for radio resources by terminal devices located in the one or more of the respective predetermined geographical regions; and
the transmitter is operable to, in response to a change in the amount of predetermined radio resources allocated to the one or more respective predetermined geographical region, transmit updated mapping information to each of the plurality of terminal devices, the updated mapping information identifying each changed set of predetermined radio resources and its associated predetermined geographical region.

22. A base station according to any one of clauses 19 to 22, wherein the transmitter is operable to broadcast the mapping information to each of the plurality of terminal devices.

23. A base station for use in a wireless telecommunications system, the base station comprising:
a controller operable to select a set of predetermined radio resources for each of a plurality of predetermined geographical regions, each of the predetermined geographical regions being associated with at least one selectable set of predetermined radio resources to define mapping information, the mapping information being stored in each of a plurality of terminal devices; and
a transmitter operable to transmit information indicating the selected sets of predetermined radio resources to each terminal device, wherein each terminal device is operable to determine its geographical location, determine the predetermined geographical region of the mapping information within which the determined geographical location is located, determine the selected set of predetermined radio resources associated with the determined geographical region using the mapping information and the information transmitted by the transmitter, and perform communication with another one of the terminal devices located in the determined geographical region using the determined set of predetermined radio resources.

24. A wireless telecommunications system comprising a first terminal device according to any one of clauses 1 to 18 and a base station according to any one of clauses 19 to 22.

25. A wireless telecommunications system comprising a first terminal device according to any one of clauses 1 to 18 and a base station according to clause 23.

26. A method of operating a first terminal device for use in a wireless telecommunications system, the first terminal device comprising a receiver, a transmitter, and a storage medium operable to store mapping information, the mapping information identifying sets of predetermined radio resources and a predetermined geographical region associated with each respective set of predetermined radio resources, wherein the method comprises:
controlling the receiver to receive a geographical location of the terminal device, the geographical location of the terminal device being determined by a location unit;
determining the predetermined geographical region of the received mapping information within which the determined geographical location is located;
determining the set of predetermined radio resources associated with the determined geographical region using the received mapping information;
controlling the receiver to receive signals from a second terminal device using the determined set of predetermined radio resources; and controlling the transmitter to transmit signals to the second terminal device using the determined set of predetermined radio resources.

27. A storage medium storing a computer program for controlling a computer to perform a method according to clause 26.

28. A method of operating a base station for use in a wireless telecommunications system, the base station comprising a transmitter, wherein the method comprises:
allocating sets of predetermined radio resources to each of respective predetermined geographical regions; and
controlling the transmitter e to transmit mapping information to each of a plurality of terminal devices, the mapping information identifying each set of predetermined radio resources and its associated predetermined geographical region, wherein each terminal device is operable to determine its geographical location, determine the predetermined geographical region of the received mapping information within which the determined geographical location is located, determine the set of predetermined radio resources associated with the determined geographical region using the mapping information, and perform communication with another one of the terminal devices located in the determined geographical region using the determined set of predetermined radio resources.

29. A storage medium storing a computer program for controlling a computer to perform a method according to clause 28.

30. A method of operating a base station for use in a wireless telecommunications system, the base station comprising a transmitter, wherein the method comprises:
selecting a set of predetermined radio resources for each of a plurality of predetermined geographical regions, each of the predetermined geographical regions being associated with at least one selectable set of predetermined radio resources to define mapping information, the mapping information being stored in each of a plurality of terminal devices; and
controlling the transmitter to transmit information indicating the selected sets of predetermined radio resources to each terminal device, wherein each terminal device is operable to determine its geographical location, determine the predetermined geographical region of the mapping information within which the determined geographical location is located, determine the selected set of predetermined radio resources associated with the determined geographical region using the mapping information and the information transmitted by the transmitter, and perform communication with another one of the terminal devices located in the determined geographical region using the determined set of predetermined radio resources.

31. A storage medium storing a computer program for controlling a computer to perform a method according to clause 30.

32. A first terminal device for use in a wireless telecommunications system, the first terminal device comprising:
receiver circuitry;
transmitter circuitry;
storage circuitry operable to store mapping information, the mapping information identifying sets of predetermined radio resources and a predetermined geographical region associated with each respective set of predetermined radio resources; and
controller circuitry operable to:

receive a geographical location of the terminal device, the geographical location of the terminal device being determined by location circuitry;
determine the predetermined geographical region of the received mapping information within which the determined geographical location is located;
determine the set of predetermined radio resources associated with the determined geographical region using the received mapping information;
control the receiver circuitry to receive signals from a second terminal device using the determined set of predetermined radio resources; and
control the transmitter circuitry to transmit signals to the second terminal device using the determined set of predetermined radio resources.

33. A base station for use in a wireless telecommunications system, the base station comprising:
controller circuitry operable to allocate sets of predetermined radio resources to each of respective predetermined geographical regions; and
transmitter circuitry operable to transmit mapping information to each of a plurality of terminal devices, the mapping information identifying each set of predetermined radio resources and its associated predetermined geographical region, wherein each terminal device is operable to determine its geographical location, determine the predetermined geographical region of the received mapping information within which the determined geographical location is located, determine the set of predetermined radio resources associated with the determined geographical region using the mapping information, and perform communication with another one of the terminal devices located in the determined geographical region using the determined set of predetermined radio resources.

34. A base station for use in a wireless telecommunications system, the base station comprising:
controller circuitry operable to select a set of predetermined radio resources for each of a plurality of predetermined geographical regions, each of the predetermined geographical regions being associated with at least one selectable set of predetermined radio resources to define mapping information, the mapping information being stored in each of a plurality of terminal devices; and
transmitter circuitry operable to transmit information indicating the selected sets of predetermined radio resources to each terminal device, wherein each terminal device is operable to determine its geographical location, determine the predetermined geographical region of the mapping information within which the determined geographical location is located, determine the selected set of predetermined radio resources associated with the determined geographical region using the mapping information and the information transmitted by the transmitter, and perform communication with another one of the terminal devices located in the determined geographical region using the determined set of predetermined radio resources.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.

The invention claimed is:

1. A first terminal device for use in a wireless telecommunications system, the first terminal device comprising:
a receiver;
a transmitter;
a storage medium operable to store mapping information, the mapping information identifying sets of predetermined radio resources, and a predetermined geographical regions associated with each respective set of predetermined radio resources,
the predetermined geographical regions including:
a first predetermined geographical region associated with a first set of predetermined radio resources that are to be used by terminal devices of a first group for at least device-to-device (D2D) communication between the first terminal device and another terminal device that is associated with the first group; and
a neighboring and overlapping predetermined geographical region associated with a second set of predetermined radio resources that are to be used by terminal devices of a second group and for communication by the first terminal device when associated with the second group but not to be used for D2D communication between the first terminal device and the another terminal device when the first terminal device is associated with the second group; and
a controller operable to:
receive a geographical location of the first terminal device, the geographical location of the first terminal device being determined by a location unit;
determine the first and neighboring and overlapping predetermined geographical regions from the stored mapping information within which the determined geographical location is located, wherein groups of terminal devices are created and changed dynamically as terminal devices enter and leave each predetermined geographical region;
determine the set of predetermined radio resources associated with the determined geographical region using the stored mapping information;
control the receiver to receive signals from the another terminal device using the determined set of predetermined radio resources to be used for the D2D communication when associated with the first group; and
control the transmitter to transmit signals to the another terminal device using the determined set of predetermined radio resources to be used for the D2D communication when associated with the first group, wherein, the first terminal device, when associated with the first group, changes to the second group in response to the first terminal being separated from the another terminal device that is associated with the first group by a distance greater than a propagation distance of D2D signalling between the first and the another terminal device, when signalling is not received by the another terminal device within a predetermined time period starting at a point that the first terminal device enters the neighboring and overlapping predetermined geographic region from the first predetermined geographic region, the changing to the second group including the first terminal device switching radio resources by changing from using radio resources allocated to the first predetermined geographical region to using radio resources allocated to the neighboring and overlapping predetermined geographical region.

2. A first terminal device according to claim 1, wherein:
the receiver is operable to receive the mapping information from a base station and the controller is operable to store the received mapping information in the storage medium.

3. A first terminal device according to claim 2, wherein the receiver is operable to receive the mapping information as information which is broadcast from the base station.

4. A first terminal device according to claim 1, wherein the first terminal device comprises the location unit.

5. A first terminal device according to claim 1, wherein the controller is operable to:
determine, based on the geographical location of the first terminal device determined by the location unit, when the location of the first terminal device changes from being within a first predetermined geographical region of the mapping information to being within a second predetermined geographical region of the mapping information;
determine the set of predetermined radio resources associated with the second predetermined geographical region using the mapping information;
control the receiver to switch from receiving signals from a second terminal device using the set of predetermined radio resources associated with the first predetermined geographical region to receiving signals from the second terminal device using the set of predetermined radio resources associated with the second predetermined geographical region; and control the transmitter to switch from transmitting signals to the second terminal device using the set of predetermined radio resources associated with the first predetermined geographical region to transmitting signals to the second terminal device using the set of predetermined radio resources associated with the second predetermined geographical region.

6. A first terminal device according to claim 5, wherein there is a region of spatial overlap between the first predetermined geographical region and the second predetermined geographical region, and the controller is operable to:

determine, based on the geographical location of the first terminal device determined by the location unit, when the first terminal device is located in the region of spatial overlap;

control the receiver to begin receiving signals from a second terminal device using the set of predetermined radio resources associated with the second predetermined geographical region in addition to receiving signals from the second terminal device using the set of predetermined radio resources associated with the first predetermined geographical region; and control the transmitter to begin transmitting signals to the second terminal device using the set of predetermined radio resources associated with the second predetermined geographical region in addition to transmitting signals to the second terminal device using the set of predetermined radio resources associated with the first predetermined geographical region.

7. A first terminal device according to claim 5, wherein the controller is operable to:

control the receiver to continue to receive signals from a second terminal device using the set of predetermined radio resources associated with the first predetermined geographical region until the reception of the signals has been completed; and control the transmitter to continue to transmit signals to the second terminal device using the set of predetermined radio resources associated with the first predetermined geographical region until the transmission of the signals has been completed.

8. A first terminal device according to claim 5, wherein the controller is operable to:

control the receiver to continue to receive signals from a second terminal device using the set of predetermined radio resources associated with the first predetermined geographical region until a predetermined time period has elapsed; and control the transmitter to continue to transmit signals to the second terminal device using the set of predetermined radio resources associated with the first predetermined geographical region until the predetermined time period has elapsed.

9. A first terminal device according to claim 5, wherein when the controller determines that the location of the first terminal device has changed from being within the first predetermined geographical region to being within the second predetermined geographical region, the controller is operable to control the transmitter to transmit a message to a second terminal device located in the first predetermined geographical region instructing the second terminal device to switch from receiving signals from and transmitting signals to the first terminal device using the set of predetermined radio resources associated with the first geographical region to receiving signals from and transmitting signals to the first terminal device using the set of predetermined radio resources associated with the second geographical region.

10. A first terminal device according to claim 5, wherein when the controller determines that the location of the first terminal device has changed from being within the first predetermined geographical region to being within the second predetermined geographical region, the controller is operable to control the transmitter to transmit a message to a second terminal device located in the second predetermined geographical region instructing the second terminal device to switch from receiving signals from and transmitting signals to the first terminal device using the set of predetermined radio resources associated with the first geographical region to receiving signals from and transmitting signals to the first terminal device using the set of predetermined radio resources associated with the second geographical region.

11. A first terminal device according to claim 5, wherein:

the receiver is operable to receive a message from a second terminal device located in the second predetermined geographical region instructing the first terminal device to switch from receiving signals from and transmitting signals to the second terminal device using the set of predetermined radio resources associated with the first geographical region to receiving signals from and transmitting signals to the second terminal device using the set of predetermined radio resources associated with the second geographical region; and the controller is operable to, in response to the receiver receiving the message:

control the receiver to switch from receiving signals from the second terminal device using the set of predetermined radio resources associated with the first predetermined geographical region to receiving signals from the second terminal device using the set of predetermined radio resources associated with the second predetermined geographical region; and control the transmitter to switch from transmitting signals to the second terminal device using the set of predetermined radio resources associated with the first predetermined geographical region to transmitting signals to the second terminal device using the set of predetermined radio resources associated with the second predetermined geographical region.

12. A first terminal device according to claim 11, wherein the receiver is operable to receive the message when the first terminal device is located in the first predetermined geographical region.

13. A first terminal device according to claim 11, wherein:

the receiver is operable to receive the message when the first terminal device is located in the second predetermined geographical region; and the controller is operable to delay controlling the receiver to switch from receiving signals from the second terminal device using the set of predetermined radio resources associated with the first predetermined geographical region to receiving signals from the second terminal device using the set of predetermined radio resources associated with the second predetermined geographical region and to delay controlling the transmitter to switch from transmitting signals to the second terminal device using the set of predetermined radio resources associated with the first predetermined geographical region to transmitting signals to the second terminal device using the set of predetermined radio resources associated with the second predetermined geographical region until the receiver has received the message.

14. A first terminal device according to claim 1, wherein the sets of predetermined radio resources are for device-to-device (D2D) communication between the first terminal device and second terminal device.

15. A first terminal device according to claim 1, wherein the set of predetermined radio resources is the same for a first predetermined geographical region of the received mapping information and a second predetermined geographical region of the received mapping information, the first and second predetermined geographical regions being separated by a distance such as to avoid radio interference between the first and second predetermined geographical regions.

16. A first terminal device according to claim 1, wherein each predetermined geographical region identified in the mapping information comprises a portion of a road.

17. A first terminal device according to claim 1, wherein the controller is operable to control the transmitter to transmit the mapping information to a second terminal device.

18. A transport vehicle comprising a first terminal device according to claim 1.

19. A first terminal device for use in a wireless telecommunications system, the first terminal device comprising:
receiver circuitry;
transmitter circuitry;
storage circuitry operable to store mapping information, the mapping information identifying sets of predetermined radio resources, and predetermined geographical regions associated with each respective set of predetermined radio resources, the predetermined geographical regions including:
a first predetermined geographical region associated with a first set of predetermined radio resources that are to be used by terminal devices of a first group for at least device-to-device (D2D) communication between the first terminal device and another terminal device that is associated with the first group; and
a neighboring and overlapping predetermined geographical region associated with a second set of predetermined radio resources that are to be used by terminal devices of a second group and for communication by the first terminal device when associated with the second group but not to be used for D2D communication between the first terminal device and the another terminal device when the first terminal device is associated with the second group; and
controller circuitry operable to:
receive a geographical location of the first terminal device, the geographical location of the first terminal device being determined by location circuitry;
determine the first and neighboring and overlapping predetermined geographical regions from the stored mapping information within which the determined geographical location is located, wherein groups of terminal devices are created and changed dynamically as terminal devices enter and leave each predetermined geographical region;
determine the set of predetermined radio resources associated with the determined geographical region using the stored mapping information;
control the receiver circuitry to receive signals from the another terminal device using the determined set of predetermined radio resources to be used for the D2D communication when associated with the first group; and
control the transmitter circuitry to transmit signals to the another terminal device using the determined set of predetermined radio resources to be used for the D2D communication when associated with the first group, wherein, the first terminal device, when associated with the first group, changes to the second group in response to the first terminal being separated from the another terminal device that is associated with the first group by a distance greater than a propagation distance of D2D signalling between the first and the another terminal device, when signalling is not received by the another terminal device within a predetermined time period starting at a point that the first terminal device enters the neighboring and overlapping predetermined geographic region from the first predetermined geographic region, the changing to the second group including the first terminal device switching radio resources by changing from using radio resources allocated to the first predetermined geographical region to using radio resources allocated to the neighboring and overlapping predetermined geographical region.

* * * * *